(12) United States Patent  
Sullivan

(10) Patent No.: US 12,369,225 B2  
(45) Date of Patent: Jul. 22, 2025

(54) FLIGHT RECORDER FOR SELECTIVELY TRANSMITTING FLIGHT DATA FROM AN AIRCRAFT

(71) Applicant: Viasat Inc., Carlsbad, CA (US)

(72) Inventor: William F. Sullivan, Encinitas, CA (US)

(73) Assignee: Viasat, Inc., Carlsbad, CA (US)

( * ) Notice: Subject to any disclaimer, the term of this patent is extended or adjusted under 35 U.S.C. 154(b) by 1091 days.

(21) Appl. No.: 17/242,065

(22) Filed: Apr. 27, 2021

(65) Prior Publication Data

US 2021/0329738 A1 Oct. 21, 2021

Related U.S. Application Data

(63) Continuation of application No. 15/408,342, filed on Jan. 17, 2017, now Pat. No. 11,026,293.

(51) Int. Cl.
| | |
|---|---|
| H04W 84/06 | (2009.01) |
| H04L 67/12 | (2022.01) |
| H04W 4/38 | (2018.01) |
| H04W 4/42 | (2018.01) |
| H04B 7/185 | (2006.01) |

(52) U.S. Cl.
CPC ............ *H04W 84/06* (2013.01); *H04L 67/12* (2013.01); *H04W 4/38* (2018.02); *H04W 4/42* (2018.02); *H04B 7/18508* (2013.01)

(58) Field of Classification Search
CPC ......... H04W 84/06; H04W 4/38; H04W 4/42; H04L 67/12; H04B 7/18508
USPC ........................................................ 455/431
See application file for complete search history.

(56) References Cited

U.S. PATENT DOCUMENTS

| 6,181,990 B1 | 1/2001 | Grabowsky et al. |
| 6,735,505 B2 | 5/2004 | Levine |
| (Continued) | | |

FOREIGN PATENT DOCUMENTS

WO WO 2014174340 A1 10/2014

OTHER PUBLICATIONS

Kavi, *Beyond the Black Box*, IEEE Spectrum dated Jul. 30, 2010, 6 pgs.

(Continued)

*Primary Examiner* — Chuck Huynh  
(74) *Attorney, Agent, or Firm* — Holland & Hart LLP

(57) ABSTRACT

The described features generally relate to a flight data recorder system for adaptively transmitting flight data from an aircraft. In particular, an aircraft may collect flight data from a first set of aircraft sensors. This collected flight data may then be transmitted from the aircraft by a communication terminal of the aircraft. A flight data communication scheduler may manage the selective transmission of the flight data from the aircraft, and monitor flight parameter values associated with the flight data collected from the first set of aircraft sensors. An indication of a trigger event may be obtained, and a second set of one or more aircraft sensors of the aircraft may be activated to collect additional flight data associated with the second set of sensors. A ground station may perform aspects of adaptively transmitting flight data from an aircraft, and store flight data in a ground-based flight data recorder.

24 Claims, 10 Drawing Sheets

(56) References Cited

U.S. PATENT DOCUMENTS

| | | |
|---|---|---|
| 7,009,996 B1* | 3/2006 | Eddy .................... H04L 12/403 |
| | | 370/462 |
| 7,103,456 B2 | 9/2006 | Bloch et al. |
| 7,203,630 B2 | 4/2007 | Kolb et al. |
| 7,436,322 B2 | 10/2008 | Crank |
| 7,489,992 B2 | 2/2009 | Valette et al. |
| 7,908,042 B2 | 3/2011 | Brinkley et al. |
| 9,193,478 B2 | 11/2015 | Girod et al. |
| 2003/0032426 A1 | 2/2003 | Gilbert et al. |
| 2003/0065428 A1 | 4/2003 | Mendelson et al. |
| 2003/0067542 A1 | 4/2003 | Monroe |
| 2003/0225492 A1 | 12/2003 | Cope et al. |
| 2008/0205283 A1 | 8/2008 | McGuffin |
| 2014/0282684 A1* | 9/2014 | Keen ........................ H04N 7/18 |
| | | 725/30 |
| 2016/0119052 A1* | 4/2016 | Frerking ............... H04W 24/02 |
| | | 455/431 |
| 2017/0032683 A1 | 2/2017 | Meserole |
| 2017/0127332 A1 | 5/2017 | Axmon |

OTHER PUBLICATIONS www.engineersgarage.com, *Wireless Flight Data Recorder for Airplanes* dated Dec. 3, 2015, 4 pgs.

* cited by examiner

FLIGHT RECORDER FOR SELECTIVELY TRANSMITTING FLIGHT DATA FROM AN AIRCRAFT

CROSS REFERENCE

The present application for patent claims the benefit of U.S. patent application Ser. No. 15/408,342 by SULLIVAN, et al., entitled "FLIGHT DATA RECORDER SYSTEM FOR ADAPTIVELY TRANSMITTING FLIGHT DATA FROM AN AIRCRAFT," filed Jan. 17, 2017, assigned to the assignee hereof, and expressly incorporated herein.

BACKGROUND

Airplanes and other types of aircraft may include an onboard flight data recorder (which may also be referred to as a "black box") that records flight parameter data for the purpose of facilitating the investigation of aviation accidents and other incidents. Dozens of such flight parameters may be required to be recorded by an aircraft by regulatory agencies. For example, U.S. Federal Aviation Administration (FAA) specifies eighty-eight (88) flight parameters that must be recorded by certain commercial passenger aircraft. Since the flight data recorder is local to the aircraft, physical recovery of the flight data recorder after an incident is necessary so that the recorded data can be analyzed to detect and identify causes of an incident. However, physical recovery of an aircraft's flight data recorder may be difficult or impossible if an aircraft has crashed in the ocean or in a remote and unknown location. Even if the flight data recorder is recovered, it may have been damaged during the incident such that the recorded data is wholly or partially lost. Additionally, current flight data recorders record data in a continuous loop by overwriting previous data with newer data. For example, voice data recorders may be limited to record from thirty (30) minutes to a few hours of flight data prior to the incident. So, even if not damaged during the incident, previous data that has been overwritten is unavailable for analysis during an investigation of the incident due to storage limitations, meaning that earlier information that may provide insight into the incident may be lost to investigators.

In part to address some of these flight data recorder shortcomings, wireless systems that send flight parameter data to a recording or monitoring device on the ground have been proposed. Such systems have proposed the continuous transmission of data, usually through a dedicated radio frequency (RF) transmitter that either communicates directly with the ground to provide the transmitted flight data to a ground station, or indirectly with the ground via a satellite link. Systems that communicate directly with the ground are limited in that they do not work over the water, where an onboard flight data recorder may be the least likely to be recovered.

Airborne satellite terminals may provide a communication link between an aircraft and terrestrial networks via one or more satellites. Such terminals may be located within a radome or other enclosure on the exterior of an aircraft's fuselage or other location such as the tail. Satellite communications systems, including such satellite terminals, may be used to augment systems that communicate directly with the ground. However, switching between direct-to-ground communications and satellite communications may increase complexity in the system, and require otherwise unneeded ground transmission equipment on the aircraft, as well as additional equipment on the ground with which the aircraft can communicate. Moreover, bandwidth of the satellite communication links may be limited, while the amount of data generated by monitoring the flight parameters may be large relative to the available capacity. Even in the newest, high capacity satellite data communication systems developed to provide internet access for aircraft passengers, capacity is limited. Continuous transmission of all of the flight parameter data can result in a large amount of data generated, and where applied across thousands of aircraft flights, may overwhelm even a high-capacity satellite communication system.

As a result of the above limitations, improved systems and techniques to record flight data are desired.

SUMMARY

The described features generally relate to a flight data recorder system for adaptively transmitting flight data from an aircraft. In particular, an aircraft may collect flight data from a first set of aircraft sensors. This collected flight data may then be transmitted from the aircraft by a communication terminal of the aircraft. In some examples, the flight data may correspond to some or all of the flight data recorded in a Flight Data Recorder (FDR), Cockpit Voice Recorder (CVR), or a combination flight data recorder. A flight data communication scheduler, which may including one or more components, may manage the selective transmission of the flight data from the aircraft, and monitor flight parameter values associated with the flight data collected from the first set of aircraft sensors. In some example, the flight data communication scheduler may obtain an indication that a trigger event has occurred by monitoring the flight parameters to detect the trigger event from the monitored flight parameters. In other examples, the flight data communication scheduler obtains the indication that the trigger event has occurred by receiving an explicit indication that the trigger event has occurred from a ground station. In still other examples, the flight data communication scheduler obtains the indication that the trigger event has occurred by receiving an input from a user device on the aircraft, such as a user input from an aircraft crew member to equipment or other input devices on the aircraft. Upon obtaining the indication, a second set of one or more aircraft sensors of the aircraft may be activated to collect additional flight data associated with the second set of sensors. The second set of sensors may include one or more a microphone, camera, accelerometer, gyroscope, torsion sensor, and/or tension sensor, and the flight data associated with such sensors may include audio, video, linear acceleration, torque or rotational acceleration, torsion, tension, and/or other measurements associated with such sensors. The first set of flight data may continue to be sent along with the second set of flight data, at the same, higher, or lower transmission rate after the indication of the trigger event is obtained.

The aircraft may include a flight data communication scheduler to perform one or more of these aspects for adaptively transmitting flight data from an aircraft. The flight data communication scheduler may have an aircraft sensor interface to communicate with the first set of aircraft sensors and the second set of aircraft sensors, a communication terminal interface to communicate with a communication terminal of an aircraft, and a flight data controller configured to receive a first set of flight data from the first set of aircraft sensors via the aircraft sensor interface, to obtain an indication of a trigger event associated with flight conditions of the aircraft, to send an activation command to the second set of aircraft sensors via the aircraft sensor interface, and to control the communication terminal of the aircraft via the communication terminal interface to transmit a second set of flight data received from the second set aircraft sensors based at least in part on the indication of the trigger event.

A ground station may be in communication with the aircraft, and perform aspects of adaptively transmitting flight data from an aircraft. For example, the ground station may receive, from the aircraft via a communication network, the first set of flight data collected from the first set of aircraft sensors, obtain an indication of a trigger event associated with flight conditions of the aircraft based at least in part on the first set of flight data, and transmit, to the aircraft via the communication network, an instruction for activation of a second set of one or more aircraft sensors to collect a second set of flight data. The transmitted flight data may also be received by and stored at a ground station in a ground-based flight data recorder.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
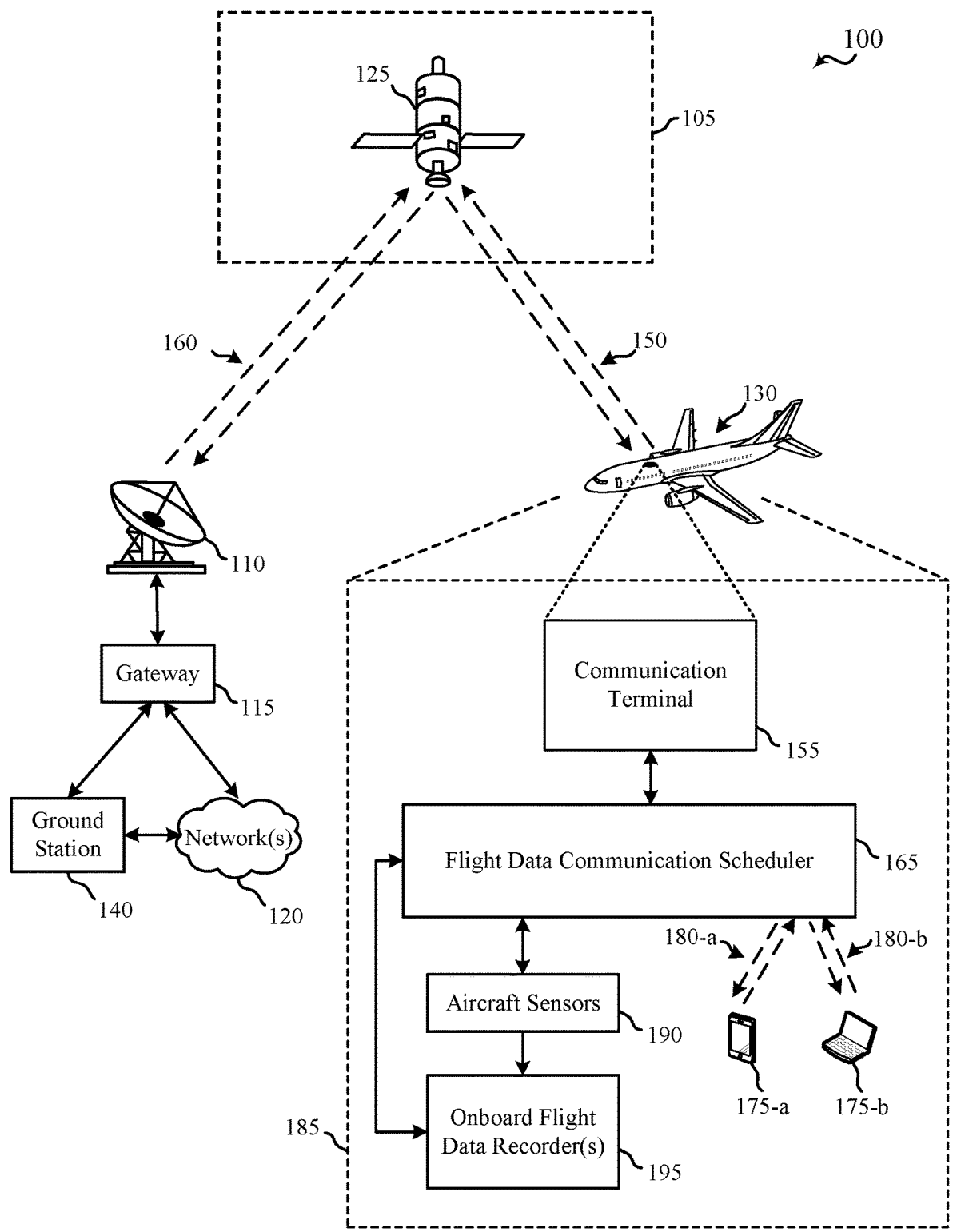
FIG. 1 shows a diagram of a satellite communication system, in accordance with various aspects of the present disclosure.

Techniques described herein supplement an onboard flight data recorder on an aircraft by also transmitting flight data from the aircraft via a wireless communication link, for example by an air-to-ground link, a satellite link, etc., for storage in a ground-based flight data recorder. The ground-based flight data recorder may be any type of storage device to store flight data.

An adaptive flight data recorder system may be used to selectively transmit flight data from an aircraft. A first amount of flight data may be transmitted from the aircraft during ordinary flight conditions, which may for example be the same flight data that are stored in an onboard flight data recorder. The flight data transmitted from the aircraft may be for some or all of the same flight data parameters as those stored in the onboard flight data recorder, which may be a Flight Data Recorder (FDR) and/or Cockpit Voice Recorder (CVR), a combination of an FDR and CVR, or their equivalent.

In response to an indication of a trigger event, a second amount of flight data is transmitted from the aircraft. The indication of the trigger event may indicate a change in flight conditions sufficient to warrant additional monitoring. For example, monitored flight parameters may indicate that a measured value for one of the flight parameters has gone outside a normal operating range for that value. In another example, an aircraft crew member may have observed an abnormal physical condition for the aircraft, such as fuselage damage caused by a bird strike.

The second amount of flight data may be a superset of the first amount of flight data that includes additional flight data, or in other examples may include a set of additional flight data along with a subset of the first amount of flight data. The additional flight data (which may be considered to be the difference between the second amount of flight data and the first amount of flight data) can vary. In some examples, the additional flight data may be one or more audio streams and/or one or more video streams captured from one or more microphones and/or video cameras located in the cockpit, passenger cabin, or other areas of the aircraft. The microphones or video cameras may be activated in response to the indication of a trigger event. In some examples, the additional flight data includes one or more flight parameters, such as control information, engine information, etc., that is sampled at a higher rate in response to the indication of the trigger event than during ordinary flight conditions.

Activating a sensor described herein, including sets of sensors, may include providing power to the sensor, sending a command to the sensor to output data, sending a command to a sensor controller or other component that manages or controls sensors to power on the sensor or command the sensor to output data, send a command (e.g., to an onboard flight data recorder) to begin recording data output from the sensor, etc.

By transmitting the flight data from the aircraft in real-time, the flight data can be used, for example, during an investigation of an incident without necessitating the survival and physical recovery of the onboard flight data recorder, which may be damaged, destroyed, lost, or otherwise compromised. In addition, the additional flight data may benefit the investigation by providing more information about the cause of the incident than would otherwise be available using only the first amount of flight data recorded by the onboard flight data recorders (e.g., including the FDR and CVR). The additional flight data may include a second set of flight data, some or all of which may be collected from a second set of sensors. Transmitting this additional flight data on a wireless communication link upon obtaining an indication of a trigger event—as opposed to continuously transmitting such data—may provide the benefits of the additional flight data in situations when such data is most useful, without dominating the wireless communication link. For example, the additional data may include video, audio, or other large data types requiring a large amount of data communication resources. These large data types may have limited to no usefulness except when there may be a change in the aircraft's flight condition signaling a potential issue with the aircraft. Thus, the benefits of the additional data, for example data from the second set of sensors activation upon obtaining an indication of a trigger event, may be gained when most relevant, without requiring large amounts of communication resources for continuous transmission.

A flight data communication scheduler in communication with a two-way communications system on the aircraft may manage and control the transmissions of the flight data from the aircraft via the wireless communication link. The flight data communication scheduler may be on the aircraft, or within a ground network, for example at a ground station, or be made up of one or more flight data communication scheduler components, some of which are on the aircraft and some of which are within the ground network, for example at the ground station. The flight data communication scheduler may be responsive to an indication of a trigger event, and switch from transmitting the first amount of flight data to transmitting the second amount of flight data, and switch from transmitting the second amount of flight data to transmitting the first amount of flight data.

The flight data communications scheduler, whether onboard the aircraft, part of a ground station, or located in part onboard the aircraft and as part of the ground station, may use various mechanisms to determine that there has been a trigger event associated with the aircraft. In some examples, the flight data communications scheduler may receive an indication of a trigger event, or may itself determine the presence of the indication by an analysis of the first amount of flight data, or a portion of the first amount of flight data. For example, the flight data communications scheduler may analyze the flight data in real time to identify the indication of a trigger event (e.g., by identifying a rapid change in a flight data parameter or a flight data parameter that exceeds or falls below a predetermined threshold amount). In some examples, the indication is in response to a notification from instruments, electronic displays, and/or sensors on the aircraft. In some examples, the indication is in response to a user input, for example from an aircraft crew member in response to their observation of a condition of the aircraft, to equipment or other user input device on the aircraft.

As described further herein, transmission of flight data may be based at least in part on the presence of an indication of a trigger event for the aircraft. Where the flight data is transmitted to a ground station via a satellite data communication system, the amount of data sent may be a portion of the transmission capacity of the system. The first set of flight data may be a duplicate of the flight parameter data to be stored in the FDR of the aircraft, a duplicate of the recorded information to be stored in the CVR of the aircraft, or a combination of FDR and CVR contents. The remainder of the transmission capacity may be used for other communications, for example for aircraft passengers to send and receive data to the internet using various passenger devices onboard the aircraft, for example mobile phones, mobile stations, wireless communication terminals, personal digital assistant (PDAs), other handheld devices, netbooks, notebook computers, tablet computers, laptops, etc.

This description provides examples, and is not intended to limit the scope, applicability or configuration of embodiments of the principles described herein. Rather, the following description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communication system 100, in accordance with various aspects of the present disclosure. The satellite communication system 100 includes a satellite system 105, including one or more satellites 125, a gateway antenna system 110, a gateway 115, and an aircraft 130. The gateway 115 communicates with one or more networks 120 and a ground station 140. The ground station 140 may also communicate directly with gateway 115, for example by being physically collocated with the gateway 115. In operation, the satellite communication system 100 provides for two-way communications between the aircraft 130 and the ground station 140 through the satellite system 105 and the gateway 115. In some examples, two-way communications may be between the aircraft 130 and the ground station 140 through the satellite system 105, the gateway 115, and networks 120.

The satellite system 105 may include one or more satellites. The one or more satellites in the satellite system 105 may include any suitable type of communication satellite. In some examples, some or all of the satellites may be in geosynchronous or geostationary earth orbit (GEO). In other examples, any appropriate orbit (e.g., medium earth orbit (MEO), low earth orbit (LEO), etc.) for satellite system 105 may be used. Some or all of the satellites of satellite system 105 may be multi-beam satellites configured to provide service for multiple service beam coverage areas in a predefined geographical service area.

The gateway antenna system 110 may be two-way capable and designed with adequate transmit power and receive sensitivity to communicate reliably with the satellite system 105. The satellite system 105 may communicate with the gateway antenna system 110 by sending and receiving signals through one or more beams 160. The gateway 115 sends and receives signals to and from the satellite system 105 using the gateway antenna system 110. The gateway 115 may be connected to the ground station 140 directly, or through the one or more networks 120. The networks 120 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

The aircraft 130 includes an on-board communication system 185 including a communication terminal 155, including an antenna, which may be an antenna array. The aircraft 130 may use an antenna of the communication terminal 155 to communicate with the satellite system 105 over one or more beams 150. The communication terminal 155 may be mounted on the outside of the fuselage or other location on the exterior of aircraft 130 under a radome, as illustrated for aircraft 130. In other examples, other types of housings may be used to house the communication terminal 155. The antenna of communication terminal 155 may operate in the International Telecommunications Union (ITU) Ku, K, or Ka-bands. Alternatively, the antenna of communication terminal 155 may operate in other frequency bands such as C-band, X-band, S-band, L-band, and the like.

Data sent over the downlink and uplink to the satellite system 105 over the one or more beams 150 may be formatted using a modulation and coding scheme (MCS) that may be custom to the satellite or similar to others in the industry. For example, the MCS may include multiple code-points that each are associated with a modulation technique (e.g., BPSK, QPSK, 16QAM, 64QAM, 256QAM, etc.) and a coding rate that is based on the ratio of the coded information bits to the total coded bits including redundant information.

The on-board communication system 185 of the aircraft 130 may provide communication services for communication devices, such as passenger devices 175, of the aircraft 130 via the communication terminal 155. Communication devices may connect to and access the networks 120 through communication terminal 155, which may include a modem, a satellite terminal, and other communications equipment supporting the reception and transmission of communications at and from aircraft 130. Passenger devices 175, which may be mobile, wireless, or other communication devices, within the aircraft 130 may communicate with one or more networks 120 via network connections 180 to flight data communication scheduler 165, which may be wired or wireless. A wireless connection may be, for example, of a wireless local area network (WLAN) technology such as IEEE 802.11 (Wi-Fi), or other wireless communication technology.

In some examples, passenger devices 175 may communicate wirelessly or with a wired connection, directly with communication terminal 155, and flight data communication scheduler 165 may control the communication terminal 155 to transmit, cease transmissions, or reduce transmissions of passenger data from communication terminal 155 via control signaling.

The flight data communication scheduler 165 may be in communication with communication terminal 155, aircraft sensors 190, and one or more onboard flight data recorders 195. In some examples, the flight data communication scheduler 165 may incorporate a flight-data acquisition unit to receive analog and digital signals from sensors for various aircraft parameters or from various audio recording devices from the aircraft sensors 190, and route these signals to the onboard flight data recorders 195. In other examples, a flight-data acquisition unit may route such signal between aircraft sensors 190 and onboard flight data recorders 195, and the flight data communication scheduler 165 may be in communication with the flight-data acquisition unit to also obtain these signals, or a subset of these signals, from the flight-data acquisition unit. Aircraft sensors 190 may be configured for aircraft 130 to provide signals indicative of various aircraft parameters, including data regarding the physical state of aircraft 130, as well as signals indicative of activities of the flight crew and passengers. For example, aircraft sensors 190 may include one or more accelerometers, gyroscopes, torsion sensors, tension sensors, fuel sensors, landing gear and cargo door proximity sensors, various engine sensors, air speed sensors, external and cabin temperature sensors, humidity sensors, altimeters, external and cabin pressure sensors, microphones and earphones for the pilots or other members of the flight crew, area microphones or video cameras in the cockpit, passenger compartments, or cargo hold, and so on. Aircraft sensors 190 may be grouped into sets. Some or all of aircraft sensors 190 may also be selectively enabled or disabled by flight data communication scheduler 165, for example based on a determination by the flight data communication scheduler 165 that a trigger event has occurred, such as when an aircraft parameter has exceeded a threshold value, as further discussed below.

Onboard flight data recorders 195 may be one or more of an FDR, a CVR, a combination recorder (e.g., a single device performing both the functions of an FDR and CVR), or one or more other onboard devices that implement some or all of the functionality of an FDR or CVR. Each of the onboard flight data recorders 195 may be in communication with one or more of aircraft sensors 190 to receive data regarding various aircraft performance parameters. An FDR may record flight data associated with various aircraft performance parameters at regular intervals. Recorded parameters may include, for example, time, altitude, airspeed, heading, vertical and longitudinal acceleration, pitch attitude, roll attitude, various control inputs, selections, and surface positions, thrust, and so on. The frequency with a parameter is recorded may vary based on the parameter. A CVR may record and store audio signals from audio sensors of aircraft 130, for example microphones and/or earphones of one or more pilots for aircraft 130 and an area microphone installed in the cockpit of aircraft 130. The CVR may record a continuous loop of audio signals, for example with a 30 or 90 minute capacity such that the 30 or 90 minutes prior to an incident involving the aircraft 130 may be recoverable from the CVR after the incident. If the one or more onboard flight data recorders 195 is a combination device it may record some or all of the same flight data as an FDR or CVR.

Flight data communication scheduler 165 may send and receive passenger data to and from passenger devices 175, and send and receive such data to communication terminal 155. In some examples, passenger devices 175 may be in communication with communication terminal 155, without passenger data passing through the flight data communication scheduler 165, and flight data communication scheduler 165 may send prioritization information or control signals to the communication terminal 155 so that the communication terminal 155 may control the transmission of passenger data from the communication terminal.

Figure 2:
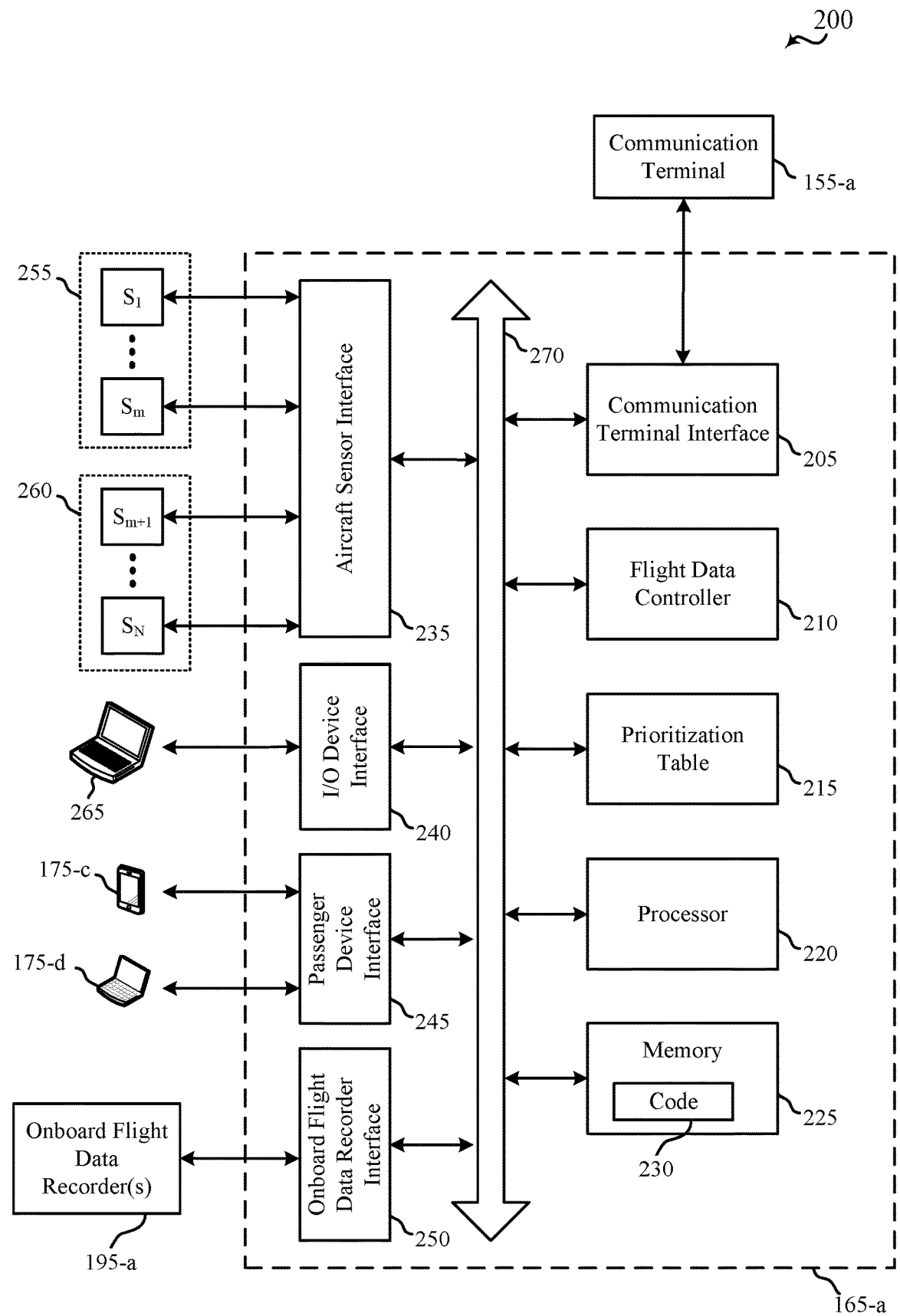
FIG. 2 shows a diagram of an example flight data communication scheduler to implement aircraft flight data communication techniques, in accordance with aspects of the present disclosure.

FIG. 2 shows a diagram 200 of an example flight data communication scheduler 165-a to implement aircraft flight data communication techniques, in accordance with aspects of the present disclosure. Flight data communication scheduler 165-a may be an example of aspects of a flight data communication scheduler 165 as described with reference to FIG. 1. Flight data communication scheduler 165-a may include a communication terminal interface 205, a flight data controller 210, a prioritization table 215, a processor 220, memory 225 including code 230, an aircraft sensor interface 235, an input/output (I/O) device interface 240, a passenger device interface 245, and a flight data recorder interface 250. Each of these components may be in communication with one another (e.g., via one or more busses 270). Processor 220 may include one or more processors (e.g., processor cores) coupled with memory 225. Code 230 may include instructions stored in the memory 225 that are executable by the one or more processors of processor 220 to enable the one or more processors to perform the features discussed herein.

The flight data communication scheduler 165-$a$ may be in communication with one or more onboard flight data recorders 195-$a$. The onboard flight data recorders 195-$a$ may be an example of onboard flight data recorders 195 described with reference to FIG. 1. The onboard flight data recorders 195-$a$ may include a FDR, a CVR, or both. Onboard flight data recorders 195-$a$ may be configured to record, in the FDR and/or CVR, flight parameters as specified by the U.S. Federal Aviation Administration (FAA) (or another country's particular regulatory body outside the U.S.) for the class of aircraft carrying the onboard flight data recorders 195-$a$. The onboard flight data recorders 195-$a$ may also include additional flight data recorders to record aircraft parameters in addition to the FDR and/or CVR.

The flight data communication scheduler 165-$a$ may also be in communication with N aircraft sensors $S_1$ through $S_N$ via aircraft sensor interface 235. The aircraft sensors $S_1$ through $S_N$ may be examples of one or more of aircraft sensors 190 described with reference to FIG. 1. The aircraft sensors $S_N$ may be grouped into one or more sets of one or more aircraft sensors. For example, the aircraft sensors $S_N$ may be grouped into two sets, each including one or more aircraft sensors: a first set of aircraft sensors 255 including aircraft sensors $S_1$ through $S_m$, and a second set of aircraft sensors 260 including aircraft sensors $S_{m+1}$ through $S_N$.

In one example, the first set of aircraft sensors 255 may include sensors that are in communication with the onboard flight data recorders 195-$a$. In particular, the first set of aircraft sensors 255 may include both sensors that provide flight parameters to the aircraft's FDR and sensors that provide flight parameters to the aircraft's CVR. Flight data communication scheduler 165-$a$ may then collect data regarding the same flight parameters as the FDR and CVR via the aircraft sensor interface.

In one example, the first set of aircraft sensors 255 may include sensors that monitor the physical state of the aircraft itself. For example, accelerometers, gyroscopes, torsion sensors, tension sensors, fuel sensors, landing gear and cargo door proximity sensors, various engine sensors, air speed sensors, external and cabin temperature sensors, humidity sensors, altimeters, external and cabin pressure sensors, etc.

In some examples, flight data communication scheduler 165-$a$ may acquire flight parameter data from the first set of aircraft sensors 255 via aircraft sensor interface 235 and route such data to the onboard flight data recorders 195-$a$ via bus 270 and onboard flight data recorder interface 250. In other examples, flight data communication scheduler 165-$a$ may be configured without onboard flight data recorder interface 250, and instead onboard flight data recorders 195-$a$ may have a communication path to the first set of aircraft sensors 255 that is external to the flight data communication scheduler 165-$a$.

The flight data communication scheduler 165-$a$ may also acquire the flight parameter data from the first set of aircraft sensors 255 via aircraft sensor interface 235 and route such data to the communication terminal 155-$a$ via the communication terminal interface 205. Communication terminal interface 205 may be an example of a communication interface to communicate with a communication terminal of the aircraft, such as communication terminal 155, ground communication terminal 425, or satellite communication terminal 430 described with reference FIGS. 1, 2, and 4. The communication terminal may then transmit the flight parameter data from the aircraft to a ground station via one or more satellites of a satellite system. A ground-based flight data recorder at the ground station may then record the flight data parameters transmitted from the aircraft at the ground station. In some examples the same flight parameter data that is stored in the onboard flight data recorder may be sent to the ground station, where the onboard flight information may be recorded at a ground-based flight data recorder at the ground station.

The second set of aircraft sensors 260 may include sensors in addition to the first set of aircraft sensors 255 that are in communication with the onboard flight data recorders 195-$a$. The second set of aircraft sensors 260 may be selectively activated by the flight data communication scheduler 165-$a$ based on a trigger event associated with the aircraft. In one example, the first set of aircraft sensors 255 may include sensors of the aircraft that provide flight parameter data to either or both of an FDR or a CVR of the aircraft, while the second set of aircraft sensors 260 may include sensors of the aircraft that do not provide flight parameter data to either of the FDR or the CVR. For example, the second set of aircraft sensors 260 may provide flight parameter data that is not required to be collected by a particular regulatory body, for example the U.S. Federal Aviation Administration (FAA) (or, outside the U.S., another country's applicable regulatory body) for a particular type or class of aircraft.

The second set of aircraft sensors 260 may include, for example, one or more microphones, cameras, accelerometers, gyroscopes, torsion sensors, or tension sensors mounted within the aircraft and in electronic communication with the aircraft sensor interface 235. In one example, an area microphone installed in the cockpit of the aircraft may be a sensor of the first set of aircraft sensors 255, and one or microphones may installed in the passenger cabin, crew areas, or bathrooms of the aircraft may be a sensor of the second set of aircraft sensors 260.

Flight data controller 210 may control the collection and routing of flight parameter data from the first set of aircraft sensors 255 and the second set of aircraft sensors 260 in accordance with the aircraft flight data communication techniques described herein. For example, the flight data controller 210 may obtain and monitor flight parameter data received from the first set of aircraft sensors 255, and compare one or more values associated with the flight parameter data to one or more thresholds to detect whether a trigger event has occurred, as further described below. Upon detection of the trigger event, the flight data controller may activate the second set of aircraft sensors 260.

The flight data controller 210 may maintain a list of thresholds, or access a maintained list of thresholds stored in memory 225, that the flight data controller 210 applies to the flight data obtained from the first set of aircraft sensors 255 that, when triggered, activate the second set of aircraft sensors 260. In some examples, a threshold may be applied to values associated with multiple flight parameters. For example, a threshold may apply to a combination of elevation parameter and vertical acceleration. In other examples, different thresholds may be used depending on the stage of flight of an aircraft. For example, an aircraft may operate in on the ground, takeoff, initial climb, climb, cruise, descent, initial approach, final approach, and landing stages. A higher threshold associated with airspeed, or change in airspeed, may be used during the cruise stage, and a lower threshold associated with the airspeed or change in airspeed may be used during a final approach stage. A threshold may be applied to a single value for a flight parameter, or an average value (e.g., a moving average value), or median value associated with a series of values collected over time for the flight data parameter.

Flight data controller 210 may also deactivate the second set of aircraft sensors 260 in accordance with the aircraft flight data communication techniques described herein. For example, when both the first set of aircraft sensors 255 and the second set of aircraft sensors 260 are operating, the flight data controller 210 may obtain and monitor flight parameter data received from one or both of the first set of aircraft sensors 255 and the second set of aircraft sensors 260. The flight data controller 210 may compare one or more values associated with the flight parameter data to a threshold to detect whether the trigger event no longer exists or has subsided. Upon determining that the trigger event no longer exists or has subsided, the flight data controller 210 may deactivate the second set of aircraft sensors 260. The threshold used may be the same as the threshold used to determine whether to activate the second set of aircraft sensors 260. The threshold may also be a different threshold, for example to introduce hysteresis to prevent ping-ponging.

Flight data communication scheduler 165-a may include an I/O device interface 240 that acts as an interface with one or more user input devices 265. User input devices 265 may be a general processing computer, a key pad, mobile device, toggle switch or other device that allows a user to signal a trigger to the flight data communication scheduler 165-a. In one example, the one or more user input devices 265 may be a simple toggle switch or button in the cabin that allows a pilot to manually indicate to the flight data communication scheduler 165-a that additional flight parameter data is to be collected.

Passenger device interface 245 may be in communication with one or more passenger devices 175, including passenger device 175-c which may be a mobile device and passenger device 175-d that may be a laptop. The connection from the passenger device interface 245 to the passenger devices 175 may be wired or wireless, and may include intermediate networking devices, such as a router and wireless access point. A wireless connection may be, for example, of a WLAN technology such as Wi-Fi, or other wireless communication technology. Flight data controller 210 may control the transmission and reception of passenger data to and from passenger device 175-c and 175-d. Passenger data may be transmitted and received from the communication terminal 155-a via the communication terminal interface 205 of flight data communication scheduler 165-a. The flight data controller 210, may, in whole or in part, control the transmission and reception of passenger data of passenger devices 175 to and from the communication terminal 155-a based on a prioritization of passenger data relative to the prioritization of flight data. In some cases, the flight data controller 210 may drop data or otherwise determine to prevent the transmission of passenger data in favor of transmitting the flight data.

In other examples, the passenger devices 175-c and 175-d may communicate wirelessly or with a wired connection, with communication terminal 155-a. In such examples, flight data controller 210 may transmit control signaling to communication terminal 155-a to provide prioritization information for communication terminal 155-a to control the transmission of passenger data from communication terminal 155-a (e.g., based on an evaluation of the priorities associated with the passenger data relative to flight data, or relative to other passenger data, to be transmitted from communication terminal 155-a).

Upon detection of the trigger event, the flight data controller 210 may activate the second set of aircraft sensors 260, and identify a third set of data to be transmitted from the aircraft. The third set of data may be passenger data received from passenger devices 175 that originated at the passenger devices 175. The flight data controller 210 may then prioritize one or both of the first set of data from the first set of aircraft sensors 255 or the second set of data from the second set of aircraft sensors 260 over the passenger data. For example, the flight data controller 210 may determine that transmission of the first set of data, the second set of data, and the passenger data may exceed the transmission capacity (e.g., the amount of scheduled resources available for data transmissions from the communication terminal 155-a) of the communication terminal 155-a, and prioritize the transmission of the first set of data and the second set of data over the transmission of the passenger data. The flight data controller 210 may reduce or eliminate the communication resources allocated to passenger data to accommodate the first and second sets of flight data.

In other examples, the flight data controller 210 may eliminate the communication resources allocated to passenger data, and reduce the communication resources allocated to the transmission of the second set of flight data to prioritize the first set of flight data after the trigger event has occurred. The flight data controller 210 may determine that the total transmission capacity has decreased for the communication terminal 155-a due to certain flight conditions.

In other examples, the transmission of the flight parameter data may be prioritized over passenger data. For example the flight data controller 210 may determine, prior to detection of a trigger event, that transmission of the first set of flight data and the passenger data may exceed the transmission capacity of the communication terminal 155-a, and prioritize the transmission of the first set of flight data over the transmission of the passenger data. The flight data controller 210 may reduce or eliminate the communication resources allocated to passenger data to accommodate the first set of flight data.

Flight data communication scheduler 165-a may also include a prioritization table 215. The prioritization table 215 may include priority information for data from the first set of aircraft sensors 255, the second set of aircraft sensors 260, and the data from the passenger devices 175. For example, the prioritization table may assign relative priorities to each of the aircraft sensors and passenger devices, individual or as groups or sets of sensors or passenger devices, to determine the priority with which data originating from each of the sensors or devices are transmitted from the aircraft by the communication terminal 155-a. In some examples, the prioritization table 215 may provide that data originating from each of the first set of aircraft sensors 255 (e.g., related to flight parameters that are determined based on measurements by one or more of the first set of aircraft sensors 255 or taken using one or more of the first set of aircraft sensors 255) is prioritized over data originating from each of the second set of aircraft sensors 260 (e.g., related to flight parameters that are determined based on measurements by one or more of the second set of aircraft sensors 260 or taken using one or more of the second set of aircraft sensors 260), which is prioritized of data originating from each of the passenger devices 175. In some examples, data originating from each of the first set of aircraft sensors 255 and the second set of aircraft sensors 260 may be sent first, while data originating from each of the passenger devices 175 may only be sent when extra transmission capacity is available. Flight data controller 210 may access the prioritization table 215 to determine the data that will be transmitted from the aircraft via the communication terminal 155-a.

The prioritization table 215 may also prioritize data related to particular flight parameters individually. For example, an airspeed that is calculated based on information received from one or more sensors of the first set of aircraft sensors 255 may be prioritized over a cockpit area recording that is based on information received from one or more sensors of the first set of aircraft sensors 255 (e.g., a cockpit area microphone). In some examples, the communication terminal 155-a may provide adequate communication resources to send less than all the data regarding the first set of aircraft sensors 255. For example, the flight data communication scheduler 165-a may send a request to the gateway 115 and/or ground station 140 to request additional resources to be scheduled for transmission of data from the aircraft 130 via communication terminal 155-a. Prioritization at the level of individual flight parameters may allow for the partial recovery of flight data parameter information in the event of an incident involving the aircraft.

The first set of aircraft sensors 255 or second set of aircraft sensors 260 may include other types or configurations of sensors in accordance with the aircraft flight data communication techniques described herein. For example, the first set of aircraft sensors may include sensors that provide flight parameter data but are not otherwise recorded in an onboard flight data recorder (e.g., FDR or CVR), but may be transmitted from the aircraft via the communication terminal 155-a. In other examples, aircraft sensors $S_1$ through $S_N$ may be grouped into additional numbers of sets of aircraft sensors, for example three or more such sets. The aircraft may also include additional sensors that are not in communication with the aircraft sensor interface 235. In some examples, one or more of these additional sensors may be recorded in the onboard flight data recorders 195-a, but flight parameter data associated with these additional sensors may not be transmitted from the communication terminal of the aircraft under the control or direction of the flight data controller 210.

Figure 3:
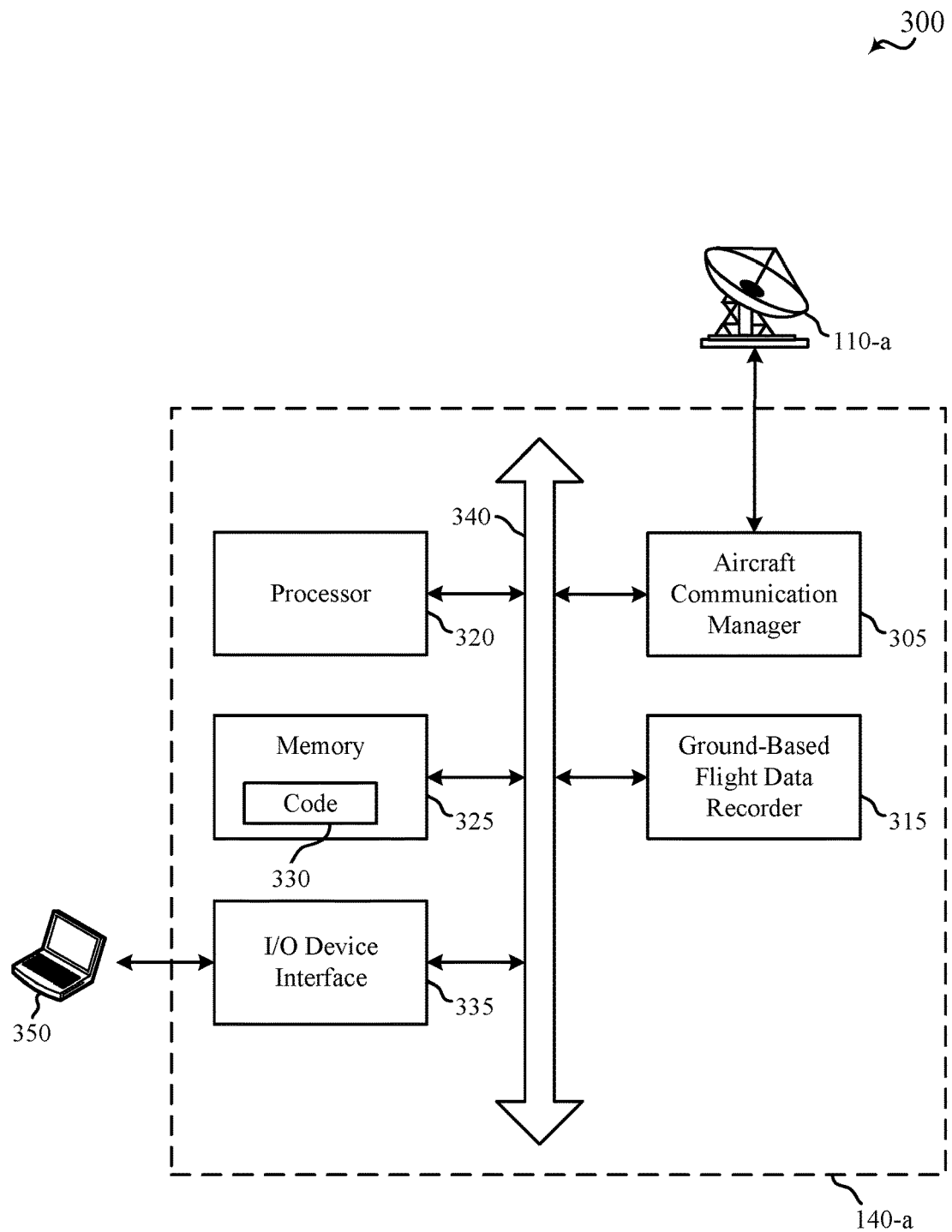
FIG. 3 shows a diagram of a ground station to implement aircraft flight data communication techniques, in accordance with aspects of the present disclosure.

FIG. 3 shows a diagram 300 of a ground station 140-a to implement aircraft flight data communication techniques, in accordance with aspects of the present disclosure. Ground station 140-a may include an aircraft communication manager 305, a ground-based flight data recorder 315, a processor 320, memory 325 that includes computer-executable software/firmware code 330, and an I/O device interface 335. Each of these components may be in communication with one another (e.g., via one or more busses 340). Processor 320 may include one or more processors coupled with memory 325. Code 330 may include instructions stored in the memory 325 that are executable by the one or more processors of processor 320 to enable the one or more processors to perform the features discussed herein.

Ground station 140-a may be located at or in close proximity to a gateway and gateway antenna system 110-a. In other examples, ground station 140-a may be remote from the gateway, and send and receive data (e.g., the above-described flight parameter data transmitted from the aircraft) via a wired or wireless communication network, such as the Internet.

Aircraft communication manager 305 may send and receive information from an aircraft via a communication network. The aircraft communication manager 305 may receive data (e.g., flight parameter data, as well as audio and video data) collected by sets of aircraft sensors from various aircraft, as well as other communications from the aircraft. Aircraft communication manager 305 may be an example of a communication interface to communicate with a communication terminal of the aircraft, such as communication terminal 155, ground communication terminal 425, or satellite communication terminal 430 described with reference to FIGS. 1, 2, and 4.

In some examples, the communication network may be a satellite communication network, such that the aircraft communication manager 305 of ground station 140-a may interface with a gateway antenna system 110-a that transmits and receives wireless transmissions from one or more satellites of the satellite communication system. In this example, the aircraft is also in communication with one or more satellites of the satellite communication system to transmit flight parameter data as further described herein. In other examples, the communication network may include a direct air-to-ground communication system, such that an aircraft communicates directly with a ground station, which may be ground station 140-a or may be a separate ground station with which ground station 140-a is in communication. For example, the air-to-ground communication system may be a radio frequency communication system using high frequency (HF), very high frequency (VHF), ultra-high frequency (UHF), or another suitable transmission media. In some examples, the ground station 140-a may transmit instructions to an aircraft via one type of communication network (e.g., using a direct air-to-ground communication system) and may receive flight data from an aircraft via a second type of communication network (e.g., using a satellite communication network).

Ground-based flight data recorder 315 may store one or both of the first set of flight data and the second set of flight data received from an aircraft. In other examples the ground station receives sets of flight data from more than aircraft, the ground-based flight data recorder 315 may record such data under the direction and control of the flight data communication scheduler. Ground-based flight data recorder 315 may be a combination recorder that implement some or all of the functionality of an FDR or CVR (e.g., a single device performing at least both the functions of an FDR and CVR), as well as store additional flight data transmitted from the aircraft. The ground-based flight data recorder 315 may comprise an array of hard drives or other storage media under the direction of server software, which may be part of the ground-based flight data recorder 315 or flight data communication scheduler. Available storage capacity on the aircraft may be limited. Because the ground station faces fewer constraints on weight, power consumption, and volume than for the aircraft's onboard flight data recorder, data for an increased number of flight parameters may be stored at the ground station for a longer duration. For example, several days of data for each monitored aircraft may be stored in a compressed format on an array of hard drives at limited expense relative to storage options on the aircraft. In addition, because the ground station 140-a is fixed and not subject to the same stresses as an onboard flight data recorder during an incident involving the aircraft, the ground-based flight data recorder 315 need not be as robust as an onboard flight data recorder mounted to the aircraft, reducing expense of the system.

Ground station 140-a may interface with an I/O device 350 via the I/O device interface 335. I/O device 350 may be a dedicated terminal or a general purpose computing device, such as a desktop, laptop, or tablet, that may receive and display flight data from the I/O device interface 335, and receive user inputs. The certain of the flight data may be directed by the aircraft communication manager 305 to the I/O device interface 335 for display or other access by the I/O device 350. The I/O device 350 may also request flight data, for example historical flight data, from the ground-based flight data recorder 315.

In other examples, the functionality of flight data communication scheduler 165 described with reference to FIGS. 1 and 2 may be performed at ground station 140-a. For example, one or more flight data communication scheduler components at the ground station 140-a may obtain an indication that a trigger event associated with flight conditions for an aircraft have occurred. For example, the flight data communication scheduler component may monitor data received by the aircraft communication manager 305, and determine whether a trigger event has occurred. For example, the flight data communication scheduler components may monitor a flight data parameter and determine when a value associated with the flight data parameter has exceeded a threshold value. In one example, the flight data communication scheduler components may determine that a trigger event has occurred if an airspeed of the aircraft falls below a predetermined threshold associated with a certain flight stage. The flight data communication scheduler components may determine that a second set of aircraft sensors of the aircraft are to be activated to collect an additional set of flight data, and generate an instruction for the activation of the second set of aircraft sensors that is to be sent to the aircraft. The aircraft communication manager 305 may then transmit the instruction to the aircraft via the communication network, for example via a gateway antenna system 110-a of a satellite communication network.

In still other examples, certain functions of the flight data communication scheduler 165 described with reference to FIGS. 1 and 2 may be performed at the aircraft by one or more flight data communication scheduler components, while other functions may be performed at ground station 140-a by one or more additional flight data communication scheduler components. For example, a user or an application of the I/O device 350 may monitor certain of the flight data obtained by the ground station 140-a and determine that a trigger event associated with the flight conditions for an aircraft has occurred, or has dissipated if a trigger event had previously occurred. A user may use the I/O device to input such an indication of a trigger event. The indication may then be transmitted to the aircraft, and the flight data communication scheduler components at the aircraft may then activate or deactivate aircraft sensors in response to the indication, such as the second set of aircraft sensors 260 described with reference to FIG. 2.

Figure 4:
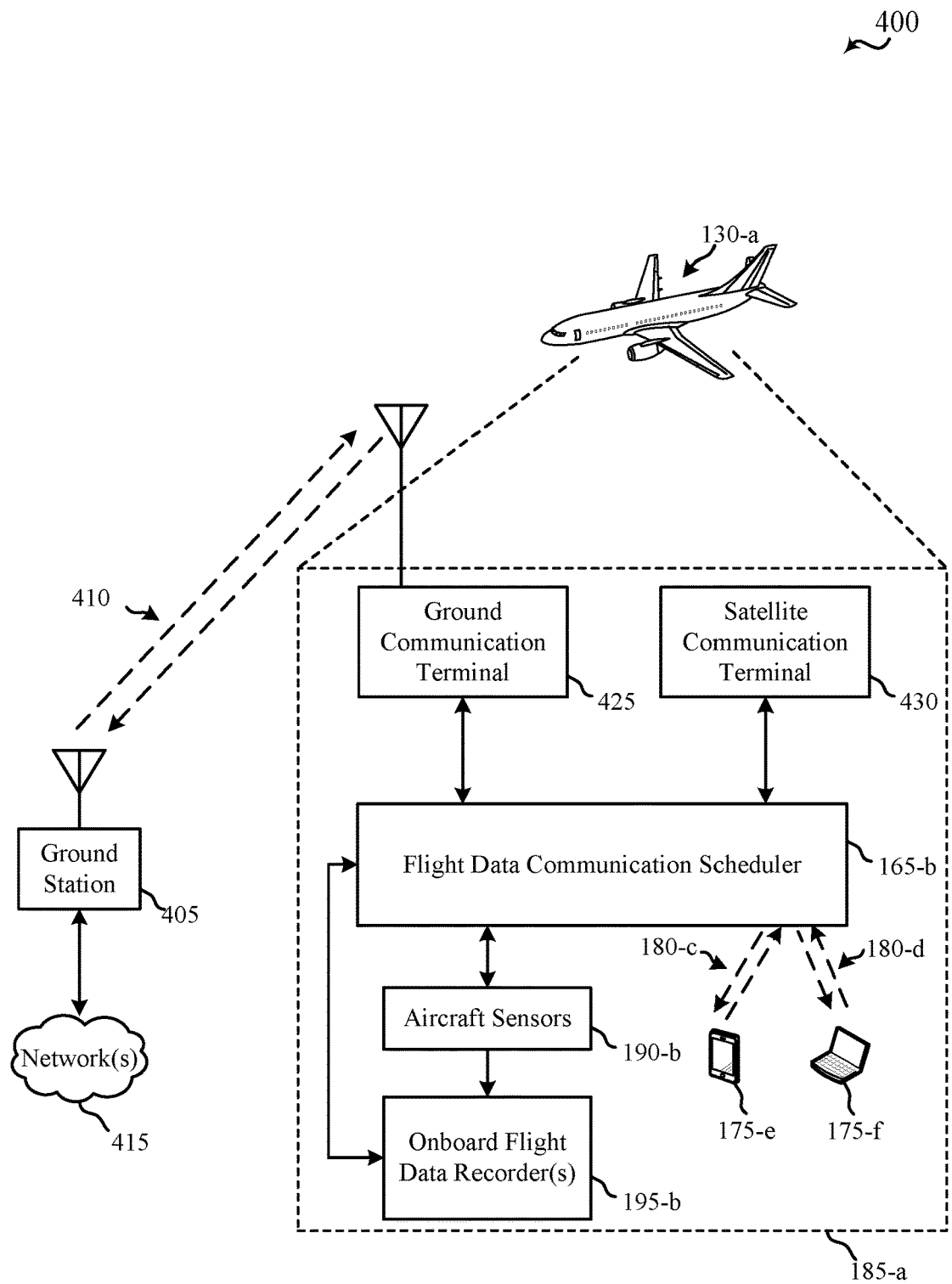
FIG. 4 shows a diagram of an air-to-ground communication system, in accordance with various aspects of the present disclosure.

FIG. 4 shows a diagram of an air-to-ground communication system 400, in accordance with various aspects of the present disclosure. The air-to-ground communication system 400 includes an aircraft 130-a and a ground station 405 in wireless communication with the aircraft 130-a. In operation, the air-to-ground communication system 400 provides for two-way communications between the aircraft 130-a and the ground station 140. Ground station 405 may provide access to network 415.

The aircraft 130-a includes an on-board communication system 185-a, which may be an example of an on-board communication system 185 illustrated with reference to FIG. 1, configured to communicate via an air-to-ground communications link 410 with ground station 405. On-board communication system 185-a may include a flight data communication scheduler 165-b, one or more aircraft sensors 190-b, and one or more onboard flight data recorders 195-b, which may be examples of the flight data communication scheduler 165, aircraft sensors 190, and onboard flight data recorders 195 described with reference to FIG. 1 or 2. On-board communication system 185-a may also include a ground communication terminal 425, and in some examples may also include a satellite communication terminal 430. The on-board communication system 185-a of the aircraft 130 may provide communication services for communication devices, such as passenger devices 175 (e.g., passenger device 175-e and passenger device 175-f), of the aircraft 130 via satellite communication terminal 430.

Flight data communication scheduler 165-b may receive flight data originating from aircraft sensors 190-b. The flight data communication scheduler 165-b may generate values for aircraft parameters based on the received flight data from the sensors, or obtain one or more values for the aircraft parameters from the onboard flight data recorders 195-b. Flight data communication scheduler 165-b may collect a first set of flight data from a first set of the aircraft sensors 190-b, and provide the first set of flight data to the ground communication terminal 425 for transmission from the aircraft 130-a. Flight data communication scheduler 165-b may obtain an indication of a trigger event, for example by comparing the first set of flight data against thresholds associated with the aircraft parameter to detect the presence of a triggering event, as further described herein. Based on the trigger event, flight data communication scheduler 165-b may activate a second set of the aircraft sensors 190-b to collect a second set of flight data.

Ground communication terminal 425 may operate using air-to-ground communication techniques, transmitting and receiving radio frequency communications using one or more HF, VHF, or UHF transmissions. Ground communication terminal 425 may transmit, to ground station 405, the first set of flight data and/or the second set of flight data, under the control and direction of the flight data communication scheduler 165-b. Ground communication terminal 425 may also receive, from ground station 405, instructions associated with flight data for the flight data communication scheduler 165-b to collect and provide to the ground station 405. For example, ground communication terminal 425 may receive an instruction from the ground station 405 to activate a second set of the aircraft sensors 190-b. The instruction may be received from the ground station 405 in response to the ground station 405 receiving the first set of flight data and determining that a trigger event has occurred based on the first set of flight data.

Certain of the flight data may also be transmitted from the aircraft 130-a to a satellite communication system to the ground station 405 via a satellite communication terminal 430. In some examples, certain of the flight data (e.g., the first set of flight data) is directly transmitted to the ground station 405 via the ground communication terminal 425, while certain other of the flight data (e.g., the second set of flight data collected after a trigger event is detected) is transmitted to the ground station 405 (or another ground station) via a satellite communication system using satellite communication terminal 430.

In still other examples, some or all of the flight data may be sent redundantly. For example, a first portion of flight data (e.g., the first set of flight data) may be transmitted from the aircraft 130-a to a satellite communication system to the ground station 405 via a satellite communication terminal 430, while the same portion of flight data is directly transmitted to the ground station 405 via the ground communication terminal 425. In some examples, the first portion of flight data (e.g., the first set of flight data) may be transmitted directly transmitted to the ground station 405 via the ground communication terminal 425 prior to a trigger event being detected, while redundant transmissions of a second portion of the flight data (e.g., flight data originating from both the first set of flight sensors and the second set of flight sensors) may be transmitted to the ground station 405 both directly via the ground communication terminal 425 and through a satellite communication system via a satellite communication terminal 430.

In some examples, flight data communication scheduler 165-b may include a communication interface to communicate with a communication terminal of the aircraft, such as communication terminal 155, ground communication terminal 425, or satellite communication terminal 430 described with reference FIGS. 1, 2, and 4.

Figure 5A:
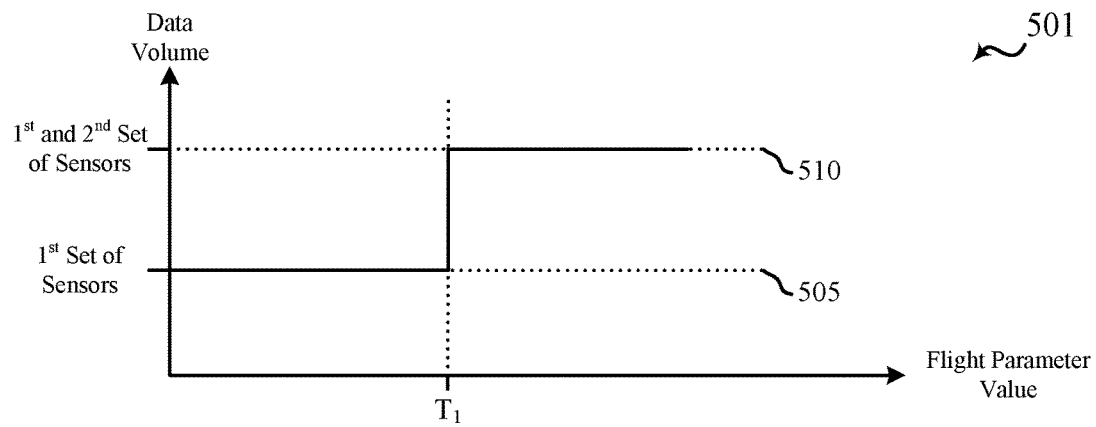
FIGS. 5A through 5C illustrate graphs showing transmitted data volume as a function of a flight parameter value, in accordance with various aspects of the present disclosure.
Figure 5B:
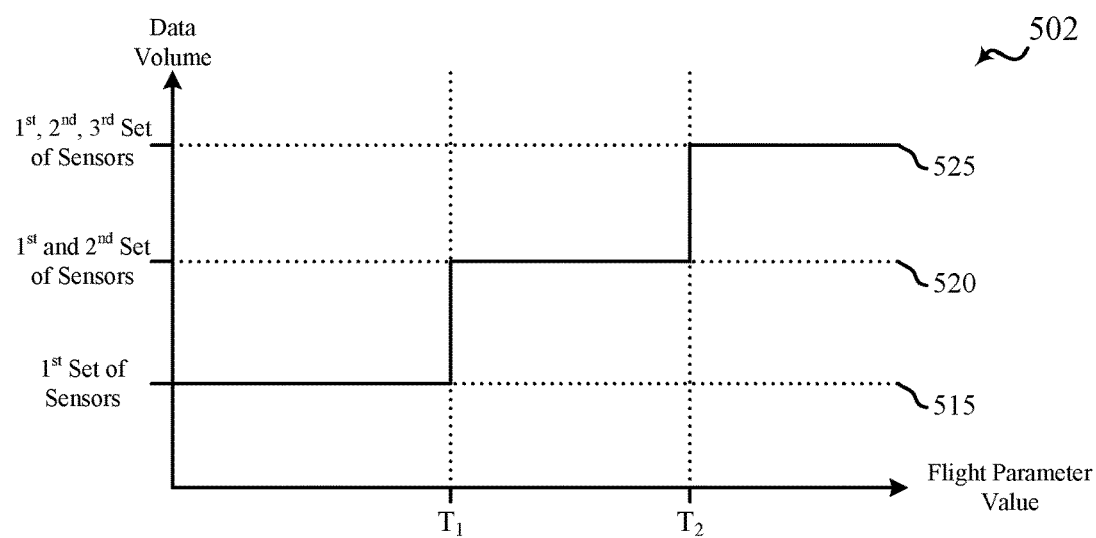
Figure 5C:
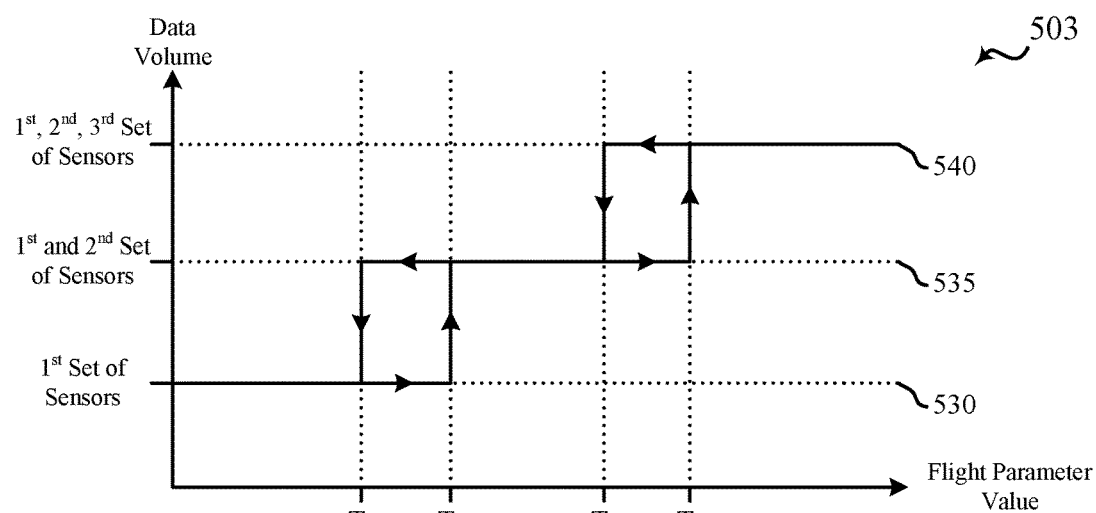

FIGS. 5A-5C illustrate graphs showing transmitted data volume as a function of a flight parameter value, in accordance with various aspects of the present disclosure. The features illustrated may be performed by one or more of the flight data communication scheduler 165 or flight data controller 210 as described with reference to FIGS. 1 through 4.

FIG. 5A illustrates a graph 501 showing transmitted data volume as a function of a flight parameter value using a single threshold $T_1$. A data volume 505 associated with flight parameter data obtained from a first set of one or more sensors may be transmitted from the aircraft for flight parameter values less than a predetermined threshold value $T_1$ for the flight parameter value. If the flight parameter value exceeds threshold $T_1$, a second set of one or more sensors may be activated, and flight data associated with the second set of one or more sensors may also be transmitted from the aircraft, resulting in a data volume 510 associated with flight data obtained from both the first and second sets of one or more aircraft sensors.

The flight parameter value may represent a value from the first set of flight data for a flight parameter at a particular time. For example, the first set of flight data may include data regarding the airspeed of the aircraft at various times, where the flight parameter is the airspeed. The value associated with the airspeed at a particular time may be the flight parameter value. The flight parameter value may also represent an average, moving average, median, or other value based on multiple flight parameter values. If this flight parameter value exceeds predetermined threshold value $T_1$, then a second set of a flight sensors may be activated to collect additional flight data, while the flight parameter continues to be monitored and flight data collected from the first set of aircraft sensors. The flight data collected from the first set of aircraft sensors and the flight data collected from the second set of aircraft sensors together making up the data volume to be transmitted from the aircraft. If the flight parameter value then falls back below predetermined threshold value $T_1$, then the second set of sensors may be deactivated. In other examples, the second set of sensors may remain active, but flight data may not be collected from the second set of sensors or the flight data not transmitted from the aircraft along with the flight data collected from the first set of sensors.

In other examples, the flight data collected from the first set of aircraft sensors may be transmitted from the aircraft at a first transmission rate. When the flight parameter value exceeds the second threshold $T_2$, a sampling rate for flight data collected from the first set of aircraft sensors may be increased to a higher sampling rate, and may be transmitted from the aircraft with a higher transmission rate as a result. The flight data collected from the first set of aircraft sensors may be transmitted in addition to the flight data collected from the second set of aircraft sensors. The transmission rate of flight data may mean a number of values or samples associated with the aircraft, such that a higher transmission rate for the flight data results in an increased in the transmitted data volume.

FIG. 5B illustrates a graph 502 showing transmitted data volume as a function of a flight parameter value using two thresholds, threshold $T_1$ and threshold $T_2$. A data volume 515 associated with flight parameter data obtained from a first set of one or more sensors may be transmitted from the aircraft for flight parameter values less than a predetermined threshold value $T_1$ for the flight parameter value. If the flight parameter value exceeds threshold $T_1$, a second set of one or more sensors may be activated, and flight data associated with the second set of one or more sensors may also be transmitted from the aircraft, resulting in a data volume 520 associated with flight data obtained from both the first and second sets of one or more aircraft sensors. If the flight parameter value exceeds yet another threshold $T_2$, a third set of one or more sensors may be activated, and flight data associated with the third set of one or more sensors may also be transmitted from the aircraft, resulting in a data volume 525 associated with flight data obtained from the first, second, and third sets of one or more aircraft sensors.

In other examples, when the flight parameter value exceeds a third threshold $T_3$, the flight data collected from the first and/or second sets of aircraft sensors may be transmitted from the aircraft at a higher transmission rate, with or without the activation of a third set of sensors.

FIG. 5C illustrates a graph 503 showing transmitted data volume as a function of a flight parameter value using four thresholds, thresholds $T_1$, $T_2$, $T_3$, and $T_4$. The thresholds $T_1$, $T_2$, $T_3$, and $T_4$ may be used to introduce hysteresis to the collection of flight data to reduce frequent activation and deactivation of sets of sensors. For example, the flight parameter value may rise and fall frequently around the value of threshold $T_1$. A data volume 530 associated with flight parameter data obtained from a first set of one or more sensors may be transmitted from the aircraft for flight parameter values less than a predetermined threshold value $T_1$ for the flight parameter value. If the flight parameter value exceeds threshold $T_1$, a second set of one or more sensors may be activated, associated with data volume 535 for both the first and second sets of one or more aircraft sensors. If the flight parameter value exceeds yet another threshold $T_2$, a third set of one or more sensors may be activated, or flight data collected at a higher transmission rate for the second and/or third set of sensors, resulting in a data volume 540 associated with flight data obtained from the first, second, and third sets of one or more aircraft sensors. If the flight parameter value then decreases below threshold $T_3$, having already decreased below threshold $T_2$, the collection of flight data from the third set of sensors, or the transmission flight data at a higher transmission rate, may be suspended. Thus, the first and second set of sensors may collect flight data below threshold $T_3$, the data volume represented by 535. Similarly, if the flight parameter value continues to decrease down to below threshold $T_4$, having already decreased below threshold $T_1$, the collection of flight data from the second set of sensors may be suspended and the second set of sensors deactivated, reducing the data volume to 530 associated with flight data collected from the first set of one or more sensors.

Figure 6:
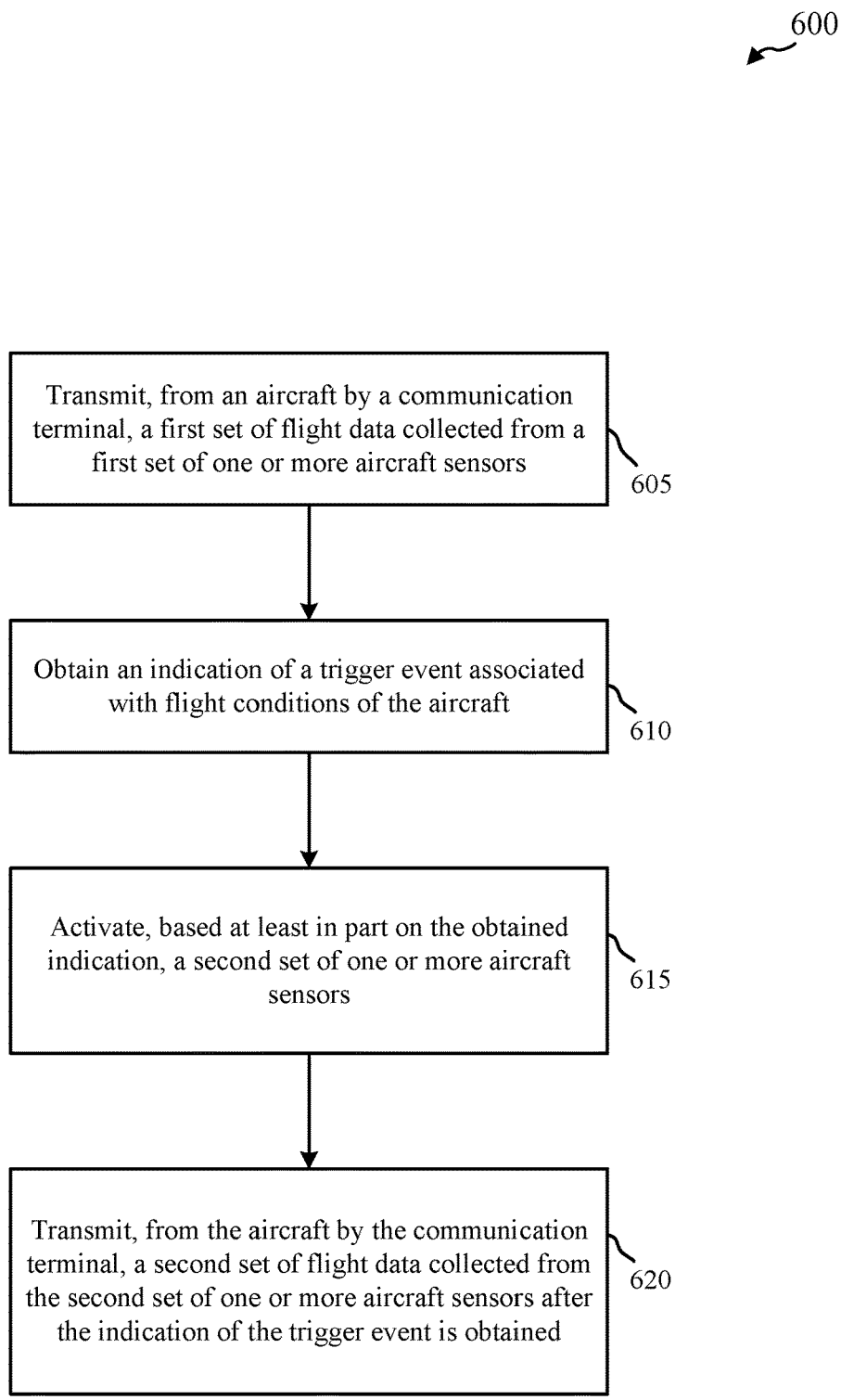
FIGS. 6 through 9 show flowcharts illustrating exemplary methods to implement aircraft flight data communication techniques, in accordance with aspects of the present disclosure.

FIG. 6 shows a flowchart illustrating an exemplary method 600 to implement aircraft flight data communication techniques, in accordance with aspects of the present disclosure. The steps of the exemplary method 600 may be performed by various devices of a communications system, for example one or more of an on-board communication system 185, a flight data communication scheduler 165, a communication terminal 155, or a ground communication terminal 425, as described with reference to FIGS. 1, 3, and 4.

At step 605, the exemplary method 600 may include transmitting, from an aircraft 130 by a communication terminal, a first set of flight data collected from a first set of one or more aircraft sensors. In some examples, the communications terminal may be a communication terminal 155, a flight data controller 210, a ground communication terminal 425, and/or a satellite communication terminal 430. The first set of flight data may be collected from a first set of aircraft sensors, which may be a subset of one or more aircraft sensors 190, or one or more of a first set of aircraft sensors 255 that includes aircraft sensors $S_1$ through $S_m$. The first set of aircraft sensors may include one or more accelerometers, gyroscopes, torsion sensors, tension sensors, fuel sensors, landing gear and cargo door proximity sensors, various engine sensors, air speed sensors, external and cabin temperature sensors, humidity sensors, altimeters, external and cabin pressure sensors, area microphones, and or earphones of one or more pilots, etc. In some examples, the first set of flight data may correspond in whole or in part to flight parameter data that is stored in an FDR, CVR, or other onboard flight data recorders of aircraft 130.

At step 610, the exemplary method 600 may include obtaining an indication of a trigger event associated with flight conditions of an aircraft 130. In some examples, the trigger event may be determined at the aircraft, for example by flight data communication scheduler 165 based on an analysis of the first set of flight data. In other examples, the flight data communication scheduler 165 may receive the indication of the trigger event from a ground station 140 or ground station 405. Ground station 140 or ground station 405 may have determined that a trigger event occurred based on an analysis of the first set of flight data transmitted by the aircraft 130. For example, ground station 140 or ground station 405 may monitor one or more flight parameters and when determine that the trigger event had occurred based on a the flight parameter exceeding (e.g., rising above or dropping below) a threshold value associated with the flight parameter as further described herein.

At step 615, the exemplary method 600 may include activating, based at least in part on the obtained indication in step 610, a second set of one or more aircraft sensors. In some examples, the second set of one or more aircraft sensors may be may be a subset of one or more aircraft sensors 190, or one or more of a second set of aircraft sensors 260 that includes aircraft sensors $S_{m+1}$ through $S_N$. In some examples, the second set of aircraft sensors may include sensors of the aircraft that do not provide flight parameter data to either of the FDR or the CVR, such as one or more microphones, cameras, accelerometers, gyroscopes, torsion sensors, or tension sensors mounted on or within the aircraft, such as one or microphones or video cameras installed in or about the passenger cabin, crew areas, or cargo areas of aircraft 130.

At step 620, the exemplary method 600 may include transmitting, from the aircraft 130 by the communication terminal, a second set of flight data collected from the second set of one or more aircraft sensors after the indication of the trigger event is obtained. In some examples, the communications terminal may be a communication terminal 155, a ground communication terminal 425, and/or a satellite communication terminal 430. The second set of flight data may be collected from the second set of aircraft sensors activated at step 615.

Figure 7:
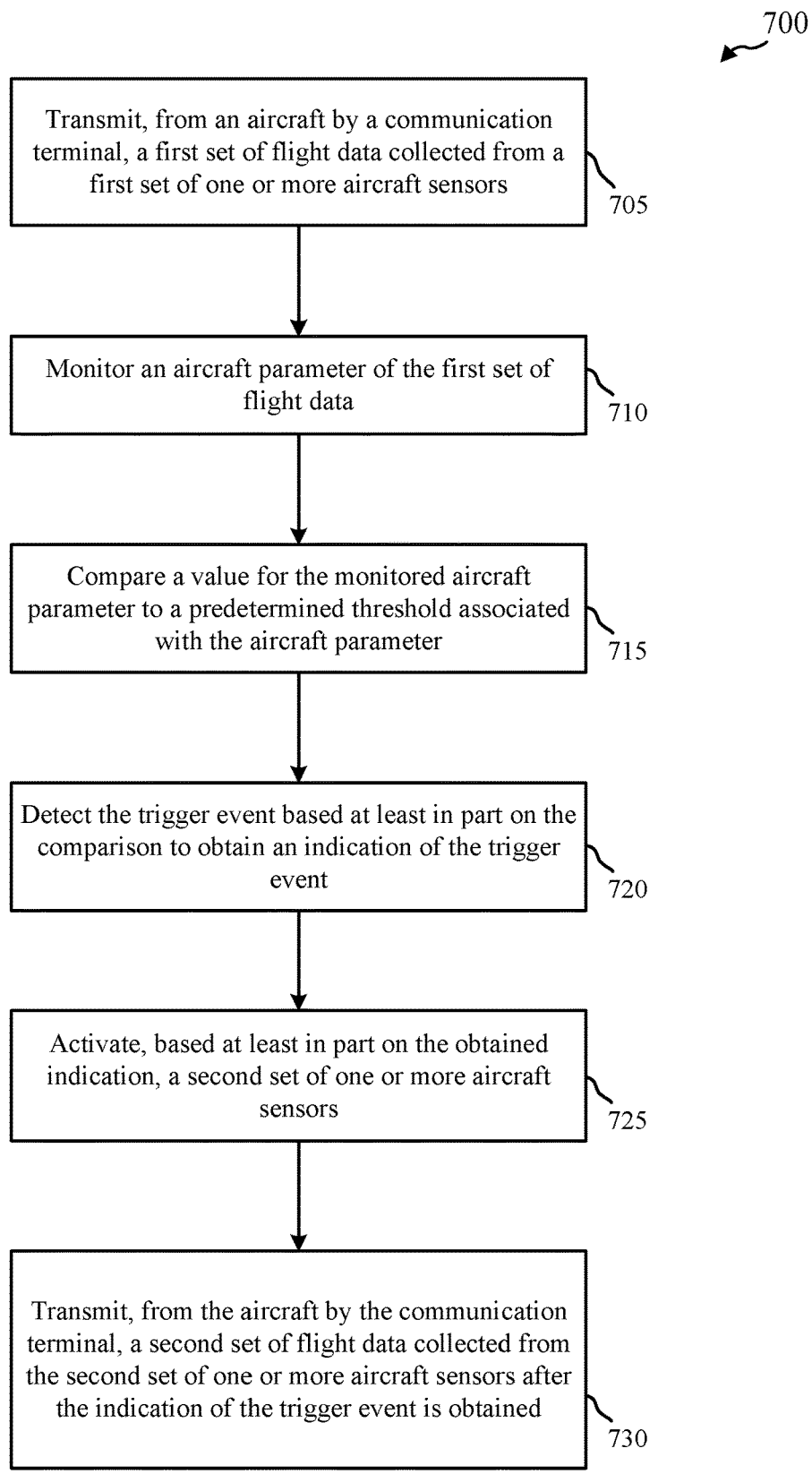

FIG. 7 shows a flowchart illustrating an exemplary method 700 to implement aircraft flight data communication techniques, in accordance with aspects of the present disclosure. The steps of the exemplary method 700 may be performed by various devices of a communications system, for example one or more of an on-board communication system 185, a flight data communication scheduler 165, a communication terminal 155, a flight data controller 210, a ground communication terminal 425, or a satellite communication terminal 430, as described with reference to FIGS. 1, 3, and 4.

At step 705, the exemplary method 700 may include transmitting, from an aircraft 130 by a communication terminal, a first set of flight data collected from a first set of one or more aircraft sensors. In some examples, the aircraft terminal may be a communication terminal 155, a ground communication terminal 425, or a satellite communication terminal 430. The first set of flight data and the first set of aircraft sensors may include one or more of the sensors described above.

At step 710, the exemplary method 700 may include monitoring an aircraft parameter of the first set of flight data. In some examples, the flight data communication scheduler 165 or flight data controller 210 may monitor one or more of the aircraft parameters of the first set of flight data that is transmitted from the aircraft 130 at step 705. The flight parameters to be monitored may be configurable by a user during operation, or configurable in response to a command received at a user input, for example from the one or more user input devices 265, or predetermined during a configuration procedure.

At step 715, the exemplary method 700 may include comparing a value for the aircraft parameter monitored at step 710 to a predetermined threshold associated with the aircraft parameter. In some examples, one or more aircraft parameters monitored in step 710 may be compared against a threshold by flight data communication scheduler 165 or flight data controller 210. The comparison may be as described with reference to FIG. 5A or 5C. In other examples, more than one threshold may be used for a single aircraft parameter, and the comparison may be as described with reference to FIG. 5B or 5C.

At step 720, the exemplary method 700 may include detecting the trigger event based at least in part on the comparison at step 715 to obtain an indication of the trigger event. In some examples, step 720 may be performed by flight data communication scheduler 165 or flight data controller 210.

At step 725, the exemplary method 700 may include activating, based at least in part on the indication obtained at step 720, a second set of one or more aircraft sensors. In some examples, step 720 may be performed by flight data communication scheduler 165, flight data controller 210, and/or aircraft sensor interface 235. The second set of one or more sensors may be a subset of one or more aircraft sensors 190, or one or more of a second set of aircraft sensors 260 that includes aircraft sensors $S_{m+1}$ through $S_N$ as further described herein.

At step 730, the exemplary method 700 may include transmitting, from the aircraft by the communication terminal, a second set of flight data collected from the second set of one or more aircraft sensors after the indication of the trigger event is obtained. In some examples, the communications terminal may be a communication terminal 155, a ground communication terminal 425, and/or a satellite communication terminal 430. The second set of flight data may be collected from the second set of aircraft sensors activated at step 725.

Figure 8:
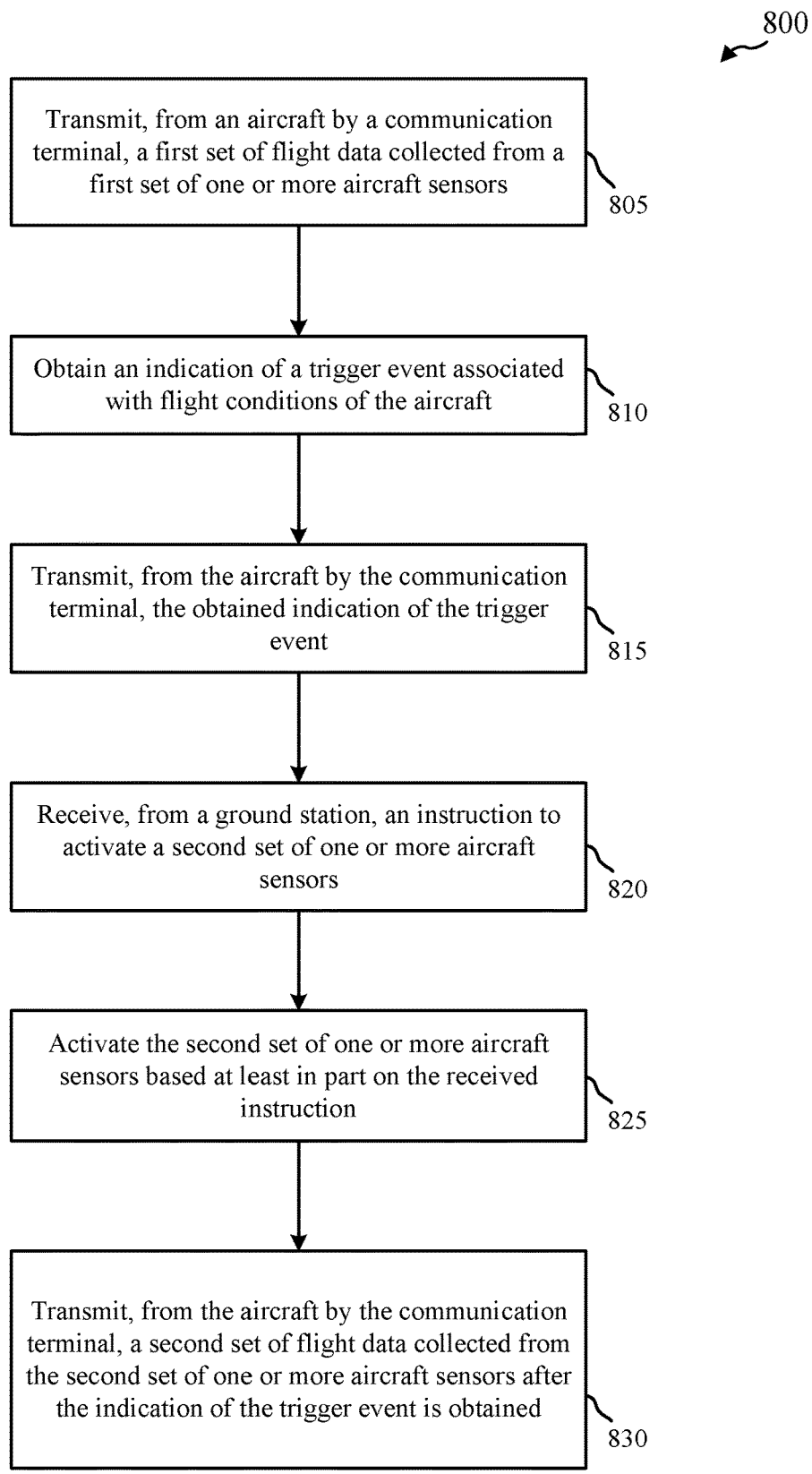

FIG. 8 shows a flowchart illustrating an exemplary method 800 to implement aircraft flight data communication techniques, in accordance with aspects of the present disclosure. The steps of the exemplary method 800 may be performed by various devices of a communications system, for example one or more of an on-board communication system 185, a flight data communication scheduler 165, a communication terminal 155, a flight data controller 210, a ground communication terminal 425, or a satellite communication terminal 430, as described with reference to FIGS. 1, 3, and 4.

At step 805, the exemplary method 800 may include transmitting, from an aircraft 130 by a communication terminal, a first set of flight data collected from a first set of one or more aircraft sensors. In some examples, the aircraft terminal may be a communication terminal 155, a ground communication terminal 425, or a satellite communication terminal 430. The first set of flight data and the first set of aircraft sensors may include one or more of the aircraft sensors described above.

At step 810, the exemplary method 800 may include obtaining an indication of a trigger event associated with flight conditions of the aircraft 130.

At step 815, the exemplary method 800 may include transmitting, from the aircraft by the communication terminal, the obtained indication of the trigger event. In some examples, the aircraft terminal may be a communication terminal 155, a ground communication terminal 425, or a satellite communication terminal 430. The communication terminal 155 may transmit to a ground station 140 via a one or more satellites 125 of a satellite system 105, or the satellite communication terminal 430 may transmit to a ground station 140 via one or more satellites of a satellite system. In other examples, ground communication terminal 425 may transmit directly to a ground station 405 or an antenna associated with the ground station 405.

At step 820, the exemplary method 800 may include receiving, from a ground station, an instruction to activate a second set of one or more aircraft sensors. In some examples ground station 140 may send the instruction to communication terminal 155 of aircraft 130 via a one or more satellites 125 of a satellite system 105, or the satellite communication terminal 430 may receive the instruction via one or more satellites of a satellite system. In other examples, ground communication terminal 425 may receive the instruction directly from ground station 405 or from an antenna associated with ground station 405. The instruction from ground station 140 or ground station 405 may be for the activation of certain aircraft sensors comprising the second set of aircraft sensors 190 or aircraft sensors 260, which may include aircraft sensors $S_{m+1}$ through $S_N$. In other examples, the instruction may specify that a second set of aircraft sensors are to be activated, without specifying the particular sensors to be activated.

At step 825, the exemplary method 800 may include activating a second set of one or more aircraft sensors based at least in part on the instruction received at step 820. The second set of aircraft sensors may include one or more of the aircraft sensors described above.

At step 830, the exemplary method 800 may include transmitting, from the aircraft 130 by the communication terminal, a second set of flight data collected from the second set of one or more aircraft sensors after the indication of the trigger event is obtained.

Figure 9:
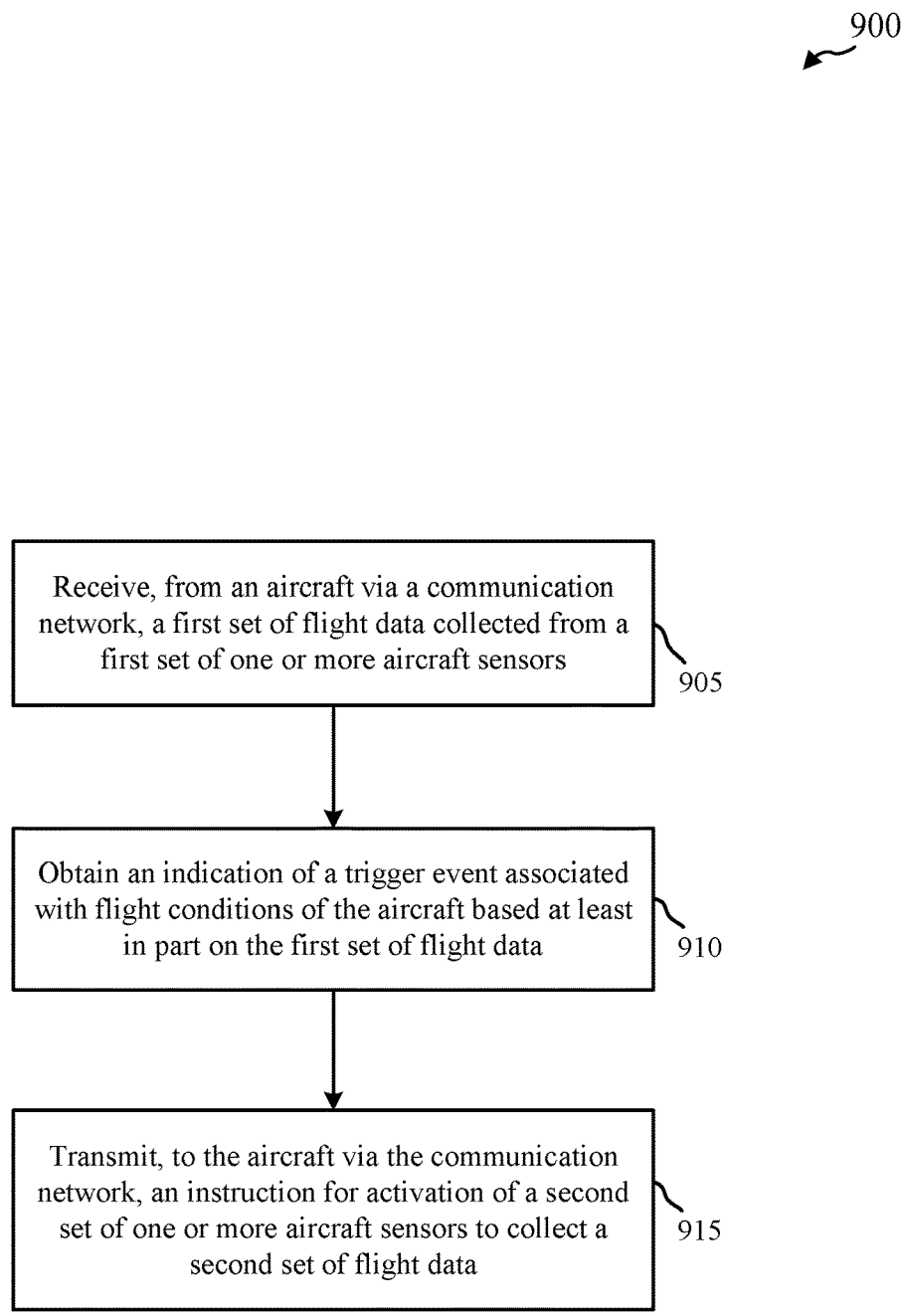

FIG. 9 shows a flowchart illustrating an exemplary method 900 to implement aircraft flight data communication techniques, in accordance with aspects of the present disclosure. The steps of the exemplary method 900 may be performed by various devices of a communications system, for example one or more of a ground station 140 or a ground station 405, as described with reference to FIGS. 1, 3, and 4.

At step 905, the exemplary method 900 may include receiving, from an aircraft 130 via a communication network, a first set of flight data collected from a first set of one or more aircraft sensors. In some examples, the communication network may include a satellite system 105. In other examples, the communication network may include a ground station 405 configured to communicate via an air-to-ground communications link 410 with an aircraft 130. The first set of flight data may have been collected from a first set of aircraft sensors that includes aircraft sensors $S_1$ through $S_m$. The first set of flight data may be data regarding flight parameters from one or more aircraft sensors that may include one or more accelerometers, gyroscopes, torsion sensors, tension sensors, fuel sensors, landing gear and cargo door proximity sensors, various engine sensors, air speed sensors, external and cabin temperature sensors, humidity sensors, altimeters, external and cabin pressure sensors, area microphones, and or earphones of one or more pilots, etc. In some examples, the first set of flight data may correspond in whole or in part to flight parameter data that is stored in an FDR, CVR, or other onboard flight data recorders of an aircraft.

At step 910, the exemplary method 900 may include obtaining an indication of a trigger event associated with flight conditions of the aircraft based at least in part on the first set of flight data. For example, the indication of the trigger event may be obtained by monitoring the first set of flight data and determining when a value associated with a flight data parameter from the first set of flight data has exceeded a threshold value, as further described above.

At step 915, the exemplary method 900 may include transmitting, to the aircraft 130 via the communication network, an instruction for activation of a second set of one or more aircraft sensors to collect a second set of flight data. For example, the instruction may indicate that a second set of aircraft sensors of the aircraft are to be activated to collect an additional set of flight data. The instruction may be for the activation of certain aircraft sensors comprising the second set of aircraft sensors 190 or aircraft sensors 260, which may include aircraft sensors $S_{m+1}$ through $S_N$, or the instruction may specify that a second set of aircraft sensors are to be activated, without specifying the particular sensors to be activated. In some examples, the communication network may include a satellite system 105. In other examples, the communication network may include an air-to-ground communications link 410 to directly transmit to the aircraft 130 from the ground.

In some examples, the communication network from which the first set of flight data is collected in step 905 may different from the communication network used to transmit the instruction to collect the second set of flight data in step 915. For example, in step 905 the first set of flight data may be received via a satellite communication network, while in step 915 the instruction to collect the second set of flight data may be sent via an air-to-ground communication link of a communication network.

It should be noted that the methods described above, including methods 600, 700, 800, and/or 800, describe possible implementations and that the operations and steps may be rearranged or otherwise modified and that other implementations are possible. Furthermore, aspects from two or more of the methods may be combined.

Figure 10:
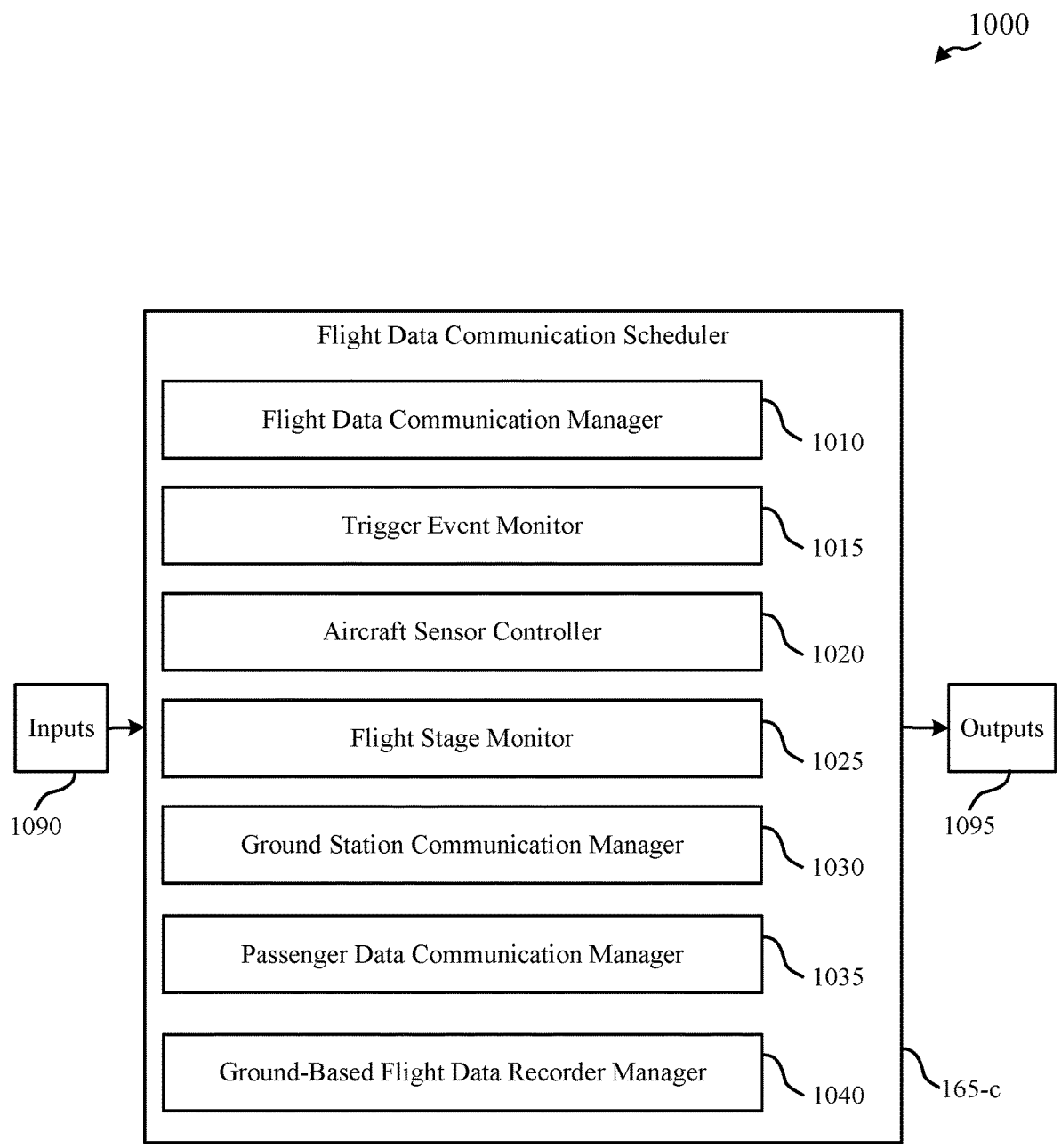
FIG. 10 shows a block diagram of a flight data communication scheduler, in accordance with aspects of the present disclosure.

FIG. 10 shows a block diagram 1000 of a flight data communication scheduler 165-c, in accordance with aspects of the present disclosure. The flight data communication scheduler 165-c may be a portion of any of an on-board communication system 185, on-board communication system 185-a, ground station 140, or ground station 405. In other examples the flight data communication scheduler 165-c may be a standalone component of an aircraft 130, ground station 140, or ground station 405, receiving inputs from and sending outputs to other components of the aircraft 130, ground station 140, or ground station 405. The flight data communication scheduler 165-c may also be or include a processor. Each of the components of the flight data communication scheduler 165-c may be in communication with each other to provide the functions described herein. The flight data communication scheduler 165-c may be configured to receive inputs 1090, and deliver outputs 1095 by various techniques, including wired or wireless communications, control interfaces, user interfaces, or the like.

The flight data communication scheduler 165-c may include a flight data communication manager 1010, which may perform any of the aspects of transmitting, from the aircraft by a communication terminal, a first set of flight data collected from a first set of one or more aircraft sensors, transmitting a second set of flight data collected from the second set of one or more aircraft sensors after an indication of the trigger event is obtained, transmitting a third set of data during the transmitting of the first set of flight data, transmitting the third set of data during the transmitting of the first set of flight data, continuing to transmit the first set of flight data collected from the first set of one or more aircraft sensors after the indication of the trigger event is obtained, continuing to transmit the first set of flight data during the transmitting of the second set of flight data, increasing a transmission rate for flight data collected from the first set of one or more aircraft sensors based at least in part on the obtained indication of a trigger event, receiving, from an aircraft via a communication network, a first set of flight data collected from a first set of one or more aircraft sensors, and transmitting, to the aircraft via the communication network, an instruction for activation of a second set of one or more aircraft sensors to collect a second set of flight data as described with reference to FIGS. 1 through 9. In some examples, the flight data communication manager 1010 may prioritize the first set of flight data over the third set of flight data. In other examples, the first set of flight data corresponds to flight data stored in an onboard flight data recorder of the aircraft.

In some examples, the flight data communication manager 1010, may receive, from a ground station, the indication of the trigger event via the communication terminal of the aircraft. In other examples, the flight data communication manager 1010 may receive the indication of the trigger event from a user input device on the aircraft.

The flight data communication scheduler 165-c may include a trigger event monitor 1015, which may perform any of the aspects of obtaining an indication of a trigger event associated with flight conditions of the aircraft, monitoring an aircraft parameter of the first set of flight data, comparing a value for the monitored aircraft parameter to a predetermined threshold associated with the aircraft parameter, detecting the trigger event based at least in part on the comparison, and obtaining an indication of a trigger event associated with flight conditions of the aircraft based at least in part on the first set of flight data as described with reference to FIGS. 1 through 9.

The flight data communication scheduler 165-c may include an aircraft sensor controller 1020, which may perform any of the aspects of activating, based at least in part on an obtained indication of a trigger event associated with flight conditions of the aircraft, a second set of one or more aircraft sensors, wherein activating the second set of one or more aircraft sensors may be based at least in part on an instruction received from a ground station, and collecting audio data, or video data, or a combination thereof as at least a portion of a second set of flight data as described with reference to FIGS. 1 through 9. In some examples of the aircraft sensor controller 1020, the second set of flight data further includes data collected from the first set of one or more aircraft sensors after the trigger event is detected.

The flight data communication scheduler 165-c may include a flight stage monitor 1025, which may perform any of the aspects of modifying a predetermined threshold based at least in part on a stage of flight of the aircraft described with reference to FIGS. 1 through 9.

The flight data communication scheduler 165-c may include a ground station communication manager 1030, which may perform any of the aspects of transmitting, from the aircraft by the communication terminal, an obtained indication of a trigger event associated with flight conditions of the aircraft, and receiving, from a ground station, an instruction to activate the second set of one or more aircraft sensors as described with reference to FIGS. 1 through 9.

The flight data communication scheduler 165-c may include a passenger data communication manager 1035, which may perform any of the aspects of identifying a third set of data to be transmitted from the communication terminal, wherein the third set of data originated from one or more passenger devices, prioritizing the second set of flight data over the third set of data based at least in part on the obtained indication of the trigger event, and prioritizing the first set of flight data over the third set of data based at least in part on the obtained indication of the trigger event as described with reference to FIGS. 1 through 9.

The flight data communication scheduler 165-c may include a ground-based flight data recorder manager 1040, which may perform any of the aspects of storing, at the ground station, the first set of flight data and the second set of flight data in a ground-based flight data recorder.

The components of the flight data communication scheduler 165-c, individually or collectively, may be implemented with at least one application specific integrated circuit (ASIC) adapted to perform some or all of the applicable features in hardware. Alternatively, the features may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The features may also be implemented, in whole or in part, with instructions embodied in a memory, formatted to be executed by one or more general or application-specific processors.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. An adaptive flight data recorder system, comprising:
   a first set of one or more aircraft sensors;
   a second set of one or more aircraft sensors;
   a communication interface to communicate with a communication terminal of an aircraft; and
   one or more flight data communication scheduler components to:
   receive a first set of flight data from the first set of one or more aircraft sensors;
   receive a second set of flight data from the second set of one or more aircraft sensors;
   receive a set of passenger data to be transmitted from the communication terminal, wherein the set of passenger data originated from one or more passenger devices;
   control the communication terminal of the aircraft via the communication interface to transmit the first set of flight data, the second set of flight data, and the set of passenger data from the aircraft during ordinary flight conditions;

determine that the first set of flight data and the set of passenger data exceed a transmission capacity of the communication terminal;

in response to the determination, prioritize the first set of flight data over the set of passenger data according to first priority information in a prioritization table;

determine, in response to reception of the second set of flight data from the second set of one or more aircraft sensors, that the first set of flight data, the second set of flight data, and the set of passenger data exceed the transmission capacity of the communication terminal; and in response to the determination, prioritize the first set of flight data and the second set of flight data over the set of passenger data according to second priority information in the prioritization table.

2. The adaptive flight data recorder system of claim 1, wherein the transmission capacity comprises an amount of scheduled resources available for data transmissions from the communication terminal.

3. The adaptive flight data recorder system of claim 1, wherein the one or more flight data communication scheduler components are configured to prioritize the first set of flight data over the set of passenger data according to the first priority information by reducing communication resources allocated to the set of passenger data.

4. The adaptive flight data recorder system of claim 1, wherein the one or more flight data communication scheduler components are configured to prioritize the first set of flight data over the set of passenger data according to the first priority information by eliminating communication resources allocated to the set of passenger data.

5. The adaptive flight data recorder system of claim 1, wherein the one or more flight data communication scheduler components are further configured to determine that a total of the transmission capacity has decreased, wherein the one or more flight data communication scheduler components are configured to prioritize the first set of flight data over the set of passenger data by reducing or eliminating communication resources allocated to the set of passenger data to prioritize the first set of flight data.

6. The adaptive flight data recorder system of claim 1, wherein the one or more flight data communication scheduler components are configured to prioritize the first set of flight data over the set of passenger data according to the first priority information by dropping at least a portion of the set of passenger data that originated from the one or more passenger devices.

7. The adaptive flight data recorder system of claim 1, wherein the one or more flight data communication scheduler components are configured to prioritize the first set of flight data over the set of passenger data according to the first priority information by preventing a transmission of at least a portion of the set of passenger data that originated from the one or more passenger devices.

8. The adaptive flight data recorder system of claim 1, wherein a first portion of the transmission capacity of the communication terminal is used for the first set of flight data, and a remaining portion of the transmission capacity of the communication terminal is used for passenger data.

9. The adaptive flight data recorder system of claim 1, wherein the first priority information of the prioritization table indicates relative priorities of passenger devices of the one or more passenger devices and sensors of the first set of one or more aircraft sensors.

10. The adaptive flight data recorder system of claim 1, wherein the first priority information of the prioritization table indicates relative priorities of individual sensors of the first set of one or more aircraft sensors, individual passenger devices of the one or more passenger devices, or both.

11. The adaptive flight data recorder system of claim 1, wherein the first priority information of the prioritization table indicates relative priorities of groups of sensors of the first set of one or more aircraft sensors, groups of passenger devices of the one or more passenger devices, or both.

12. The adaptive flight data recorder system of claim 1, wherein the one or more passenger devices comprise one or more of a mobile phone, a mobile station, a wireless communication terminal, a personal digital assistant, a netbook, a notebook computer, a tablet computer, or a laptop.

13. A method for flight data communication at a flight data recorder system of an aircraft, comprising:

receiving a first set of flight data from a first set of one or more aircraft sensors of the aircraft;

receive a second set of flight data from a second set of one or more aircraft sensors of the aircraft;

identifying a set of passenger data to be transmitted from a communication terminal of the aircraft, wherein the set of passenger data originated from one or more passenger devices;

controlling the communication terminal to transmit the first set of flight data, the second set of flight data, and the set of passenger data from the aircraft during ordinary flight conditions;

determining that the first set of flight data and the set of passenger data exceed a transmission capacity of the communication terminal;

controlling the communication terminal to, in response to the determination, prioritize the first set of flight data over the set of passenger data according to first priority information in a prioritization table;

determining, in response to reception of the second set of flight data from the second set of one or more aircraft sensors, that the first set of flight data, the second set of flight data, and the set of passenger data exceed the transmission capacity of the communication terminal; and controlling the communication terminal to, in response to the determination, prioritize the first set of flight data and the second set of flight data over the set of passenger data according to second priority information in the prioritization table.

14. The method of claim 13, wherein the transmission capacity comprises an amount of scheduled resources available for data transmissions from the communication terminal.

15. The method of claim 13, wherein prioritizing the first set of flight data over the set of passenger data according to the first priority information comprises reducing communication resources allocated to the set of passenger data.

16. The method of claim 13, wherein prioritizing the first set of flight data over the set of passenger data according to the first priority information comprises eliminating communication resources allocated to the set of passenger data.

17. The method of claim 13, further comprising:

determining that a total of the transmission capacity has decreased, wherein prioritizing the first set of flight data over the set of passenger data according to the first priority information comprises reducing or eliminating communication resources allocated to the set of passenger data to prioritize the first set of flight data.

18. The method of claim 13, wherein prioritizing the first set of flight data over the set of passenger data according to the first priority information comprises dropping at least a portion of the set of passenger data that originated from the one or more passenger devices.

19. The method of claim 13, wherein prioritizing the first set of flight data over the set of passenger data according to the first priority information comprises preventing a transmission of at least a portion of the set of passenger data that originated from the one or more passenger devices.

20. The method of claim 13, wherein a first portion of the transmission capacity of the communication terminal is used for the first set of flight data, and a remaining portion of the transmission capacity of the communication terminal is used for passenger data.

21. The method of claim 13, wherein the first priority information of the prioritization table indicates relative priorities of passenger devices of the one or more passenger devices and sensors of the first set of one or more aircraft sensors.

22. The method of claim 13, wherein the first priority information of the prioritization table indicates relative priorities of individual sensors of the first set of one or more aircraft sensors, individual passenger devices of the one or more passenger devices, or both.

23. The method of claim 13, wherein the first priority information of the prioritization table indicates relative priorities of groups of sensors of the first set of one or more aircraft sensors, groups of passenger devices of the one or more passenger devices, or both.

24. The method of claim 13, wherein the one or more passenger devices comprise one or more of a mobile phone, a mobile station, a wireless communication terminal, a personal digital assistant, a netbook, a notebook computer, a tablet computer, or a laptop.

\* \* \* \* \*